(12) United States Patent
Yaguchi

(10) Patent No.: US 6,587,735 B1
(45) Date of Patent: Jul. 1, 2003

(54) DATA PROCESSING APPARATUS AND PROCESSOR SELECTION METHOD

(75) Inventor: Hiroyuki Yaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/557,315

(22) Filed: Apr. 25, 2000

(30) Foreign Application Priority Data

May 10, 1999 (JP) .......................................... 11-128907
Apr. 5, 2000 (JP) ....................................... 2000-103492

(51) Int. Cl.$^7$ ............................................. G05B 19/18
(52) U.S. Cl. .................... 700/2; 700/4; 700/9; 358/1.9
(58) Field of Search ............................. 700/2, 4, 9, 28, 700/32, 39, 54; 712/245; 358/1.9, 1.13

(56) References Cited

U.S. PATENT DOCUMENTS

| | | | | |
|---|---|---|---|---|
| 5,394,534 A | * | 2/1995 | Kulakowski et al. | 711/112 |
| 5,819,026 A | * | 10/1998 | Lhotak et al. | 714/38 |
| 6,323,958 B1 | * | 11/2001 | Shimizu | 358/1.9 |
| 6,343,161 B2 | * | 1/2002 | Uchida | 382/309 |
| 6,384,832 B1 | * | 5/2002 | Muramatsu et al. | 345/505 |
| 6,490,055 B1 | * | 12/2002 | Shimizu | 358/1.9 |

* cited by examiner

*Primary Examiner*—John Follansbee
*Assistant Examiner*—Ronald D Hartman, Jr.
(74) *Attorney, Agent, or Firm*—Fitzpatrick, Cella, Harper & Scinto

(57) ABSTRACT

Disclosed are a data processing apparatus which, by being providing with a software processor for implementing prescribed data processing by software and a hardware processor for implementing the prescribed data processing by hardware, makes it possible to process externally supplied data at high speed, as well as a method of selecting processors efficiently in this data processing apparatus. If data processing has been requested, the time it takes the hardware processor to execute this data processing is acquired using test data. If the time required for processing is less than a predetermined time, the hardware processor is selected to execute processing by hardware. If the time required for processing is equal to or greater than the predetermined time, the software processor is selected to execute processing by software. The appropriate processor is selected depending upon the status of utilization of the software processor and the status of utilization of the hardware processor.

23 Claims, 33 Drawing Sheets

FIG. 21

| |
|---|
| WIDTH |
| LINES |
| SOURCE |

FIG. 31

| TYPE | NUMBER OF CODECS CURRENTLY IN USE | NO. | NOW IN USE ? |
|---|---|---|---|
| H/W CODEC | 3 | 1 | YES |
| | | 2 | NO |
| | | 3 | YES |
| | | 4 | YES |
| | | 5 | NO |
| S/W CODEC | 2 | 1 | NO |
| | | 2 | YES |
| | | 3 | NO |
| | | 4 | NO |
| | | 5 | YES |

310　311　312　313

US 6,587,735 B1

DATA PROCESSING APPARATUS AND PROCESSOR SELECTION METHOD

FIELD OF THE INVENTION

This invention relates to a data processing apparatus for subjecting input data such as image data to predetermined processing and outputting the processed data. More particularly, the invention relates to a data processing apparatus that is capable of executing multiple processes at high speed.

BACKGROUND OF THE INVENTION

Exchange of data such as images, voice and programs has become frequent over networks with the proliferation of network technologies. In many cases data compression (encoding) is employed to alleviate network load and transfer data at higher speeds. Encoding/decoding is performed using an encoder/decoder (referred to as a CODEC). CODECs can be realized by hardware such as a special-purpose LSI chip (these are hardware-implemented CODECs) or by software executed by a general-purpose processor (these are software-implemented CODECs). In general, a hardware-implemented CODEC is used when it is necessary to perform high-speed compression and a software-implemented CODEC is used if processing speed is not that important or when it is necessary to hold down cost. Thus, hardware CODECs are used in some cases and software CODECs in others.

In an arrangement in which not only interfaces for networks, scanners and printers but also a hardware CODEC are connected on a common bus such as a PCI bus, using the common bus has the advantages of greater diversity, ease of installation and lower cost achieved by unifying the interfaces. However, when a large number of users attempt to use the bus simultaneously, bus contention arises and processing takes time despite the fact that the CODEC employed is a hardware CODEC. For example, consider an arrangement in which a scanner, printer and hardware CODEC are connected to a common bus. In a case where processing for encoding the image data of a document read by the scanner and outputting the encoded data to another device connected on the network occurs in concurrence with processing for decoding image data received from another device and outputting this data using the printer function, requests to use the bus overlap and the processing takes time regardless of the fact that the processing is executed by a hardware CODEC.

In recent years the capabilities of general-purpose processors (CPUs) have improved and now even software CODECs can execute processing at speeds that are somewhat high.

Accordingly, an object of the present invention is to provide a data processing apparatus that is capable of executing externally supplied data at high speed.

Another object of the present invention is to provide a processor selection method that is capable of selecting the optimum processor at processing time in a data processing apparatus having a software processor for implementing prescribed data processing by software and a hardware processor for implementing the prescribed data processing by hardware.

SUMMARY OF THE INVENTION

According to one aspect of the present invention, there is provided a data processing apparatus having a software processor for implementing prescribed data processing by software and a hardware processor for implementing the prescribed data processing by hardware, wherein bus means which the hardware processor uses in the prescribed data processing can be used in other processing means as well, the apparatus comprising means for instructing the hardware processor to execute the prescribed data processing using test data, and selection means for selecting, in dependence upon time required to execute the processing of the test data, the processor to be used in the prescribed data processing executed thereafter.

According to another aspect of the present invention, there is provided a processor selection method in a data processing apparatus having a software processor for implementing prescribed data processing by software and a hardware processor for implementing the prescribed data processing by hardware, wherein bus means which the hardware processor uses in the prescribed data processing can be used in other processing means as well, said method comprising a step of instructing the hardware processor to execute the prescribed data processing using test data, and a selection step of selecting, in dependence upon time required to execute the processing of the test data, the processor to be used in the prescribed data processing executed thereafter.

According to a further aspect of the present invention, there is provided a computer readable storage medium storing a processor selection program used in a data processing apparatus having a software processor for implementing prescribed data processing by software and a hardware processor for implementing the prescribed data processing by hardware, wherein bus means which said hardware processor uses in the prescribed data processing can be used in other processing means as well, said storage medium having a program for a step of instructing said hardware processor to execute the prescribed data processing using test data, and a program for a selection step of selecting, in dependence upon time required to execute the processing of the test data, the processor to be used in the prescribed data processing executed thereafter.

According to still another aspect of the present invention, there is provided a data processing apparatus comprising a software processor for implementing prescribed data processing by software, a hardware processor for implementing the prescribed data processing by hardware, request detection means for detecting a request for the prescribed processing, and selection means for selecting the processor to be used in the prescribed data processing that has been requested.

According to still another aspect of the present invention, there is provided a processor selection method in a data processing apparatus having a software processor for implementing prescribed data processing by software and a hardware processor for implementing the prescribed data processing by hardware, said method comprising a request detection step of detecting a request for the prescribed processing, and a selection step of selecting, based upon a prescribed condition, the processor to be used in the prescribed data processing that has been requested.

According to still another aspect of the present invention, there is provided a computer-readable storage medium storing a processor selection program used in a data processing apparatus having a software processor for implementing prescribed data processing by software and a hardware processor for implementing the prescribed data processing by hardware, said storage medium having a program for a request detection step of detecting a request for the prescribed processing, and a program for a selection step of selecting, based upon a prescribed condition, the processor to be used in the prescribed data processing that has been requested.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 21 is a diagram showing a print parameter matrix in an engine interface board;

FIG. 31 is a diagram showing an example of a management table in a resource management unit;

DESCRIPTION OF THE PREFERRED EMBODIMENTS

Preferred embodiments of the present invention will now be described in detail in accordance with the accompanying drawings.

In the embodiments described below, an example is illustrated in which an image-data CODEC embodying the data processing apparatus of the present invention is applied to an integrated multifunction apparatus capable of being connected to a network.

(First Embodiment)

[Hardware]

Figure 1:
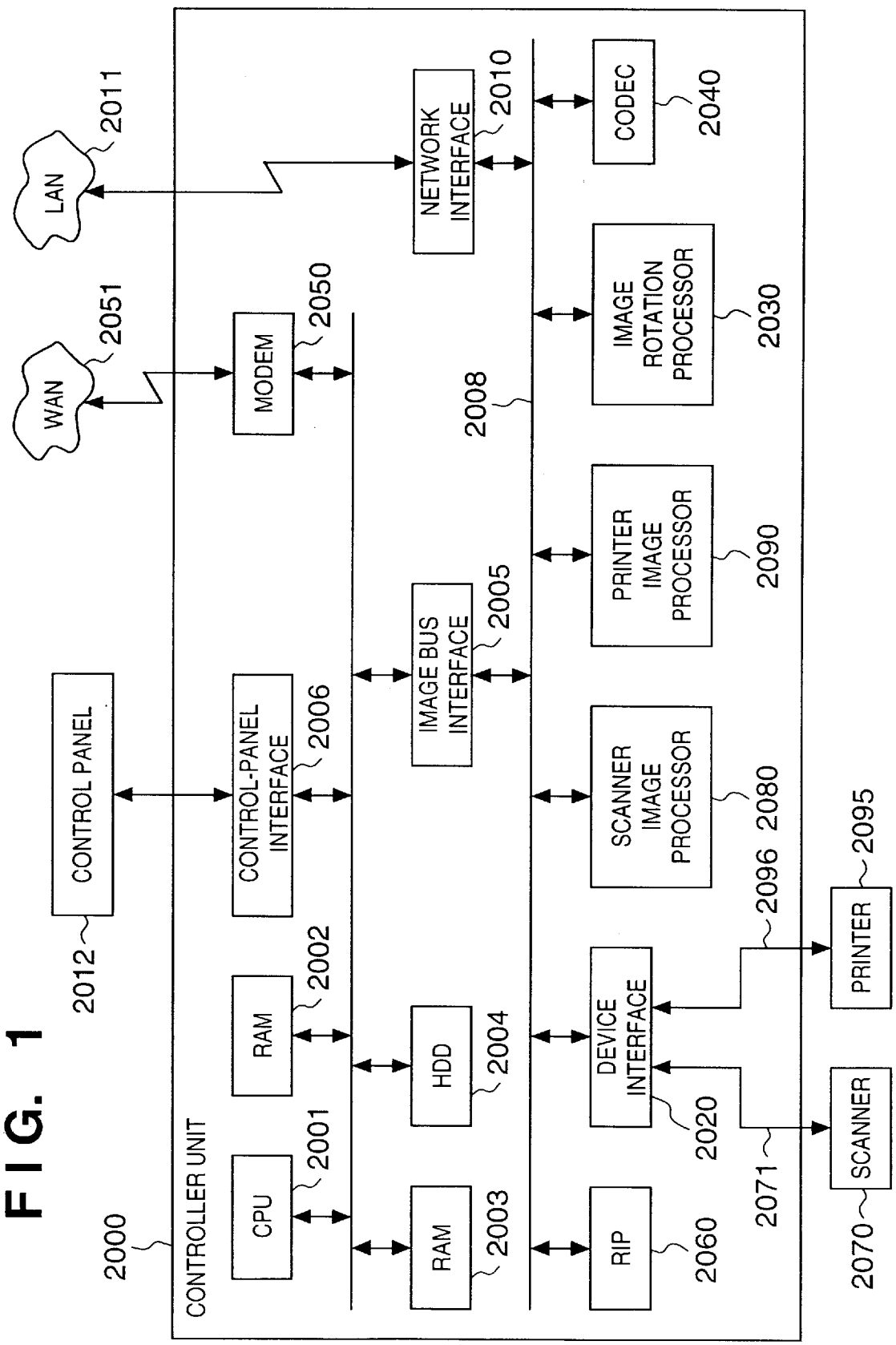
FIG. 1 is a block diagram illustrating the overall structure of a combined apparatus to which the present invention is applied.

FIG. 1 illustrates the overall structure of an integrated multifunction apparatus. The apparatus includes a controller 2000 connected to a scanner 2070 serving as an image input device and to a printer 2095 serving as an image output device. By being connected to a LAN 2011 or public circuit (WAN) 2051, the controller 2000 is capable of inputting and outputting image information and device information. A CPU 2001 is a general-purpose processor for controlling the overall integrated apparatus. A RAM 2002 is a system working memory for operation of the CPU 2001. This is an image memory for storing image data temporarily.

A ROM 2003 is a booting ROM in which the booting program of the integrated apparatus has been stored. A hard-disk drive (HDD) 2004 stores the system software and image data. A control-panel interface (I/F) 2006, which is for interfacing a control panel (user interface UI) 2012, outputs image data displayed on the control panel 2012 to the control panel 2012. Another function of the control panel 2012 is to send the CPU 2001 information that the user of the system has entered from the control panel. A modem 2050 is connected to the public circuit 2051 and serves to input and output information. The devices mentioned above are disposed on a system bus 2007.

An image bus interface 2005 is a bus bridge for connecting the system bus 2007 and an image bus 2008, which transfers image data at high speed, and for converting the data structure. The image bus 2008 is constituted by a PCI bus or IEEE 1394.

The devices set forth below are disposed on the image bus 2008.

A network interface (I/F) 2010 connects the image bus 2008 to the LAN 2011 and serves to input and output information. A raster image processor (RIP) 2060 expands PDL (Page Description Language) code into a bitmap image.

A device interface (I/F) 2020 connects the scanner 2070 and printer 2095, which are the image input and output devices, respectively, to the controller 2000 and subjects the image data to a synchronous/asynchronous conversion. A scanner image processor 2080 subjects input image data to correction, manipulation and editing. A printer image processor 2090 subjects output image data from the printer to correction and resolution conversion, etc. An image rotation unit 2030 rotates image data. A CODEC 2040 subjects multilevel image data to JPEG compression/decompression processing and subjects binary image data to JBIG, MMR or MH compression/expansion processing.

The arrangement described above is constructed in such a manner that the system bus 2007 and image bus 2008 are separate from each other taking into consideration expandability of the image processors. The structure of an ordinary computer is adopted. Making the image bus interface 2005 a general-purpose interface provides a degree of freedom that makes it possible to combine image processing operations at will and also affords expandability for future applications. In particular, the CODEC section is connected to the side of the image bus for easy interchangeability in view of the possibility that various standards may be announced in the future.

Figure 2:
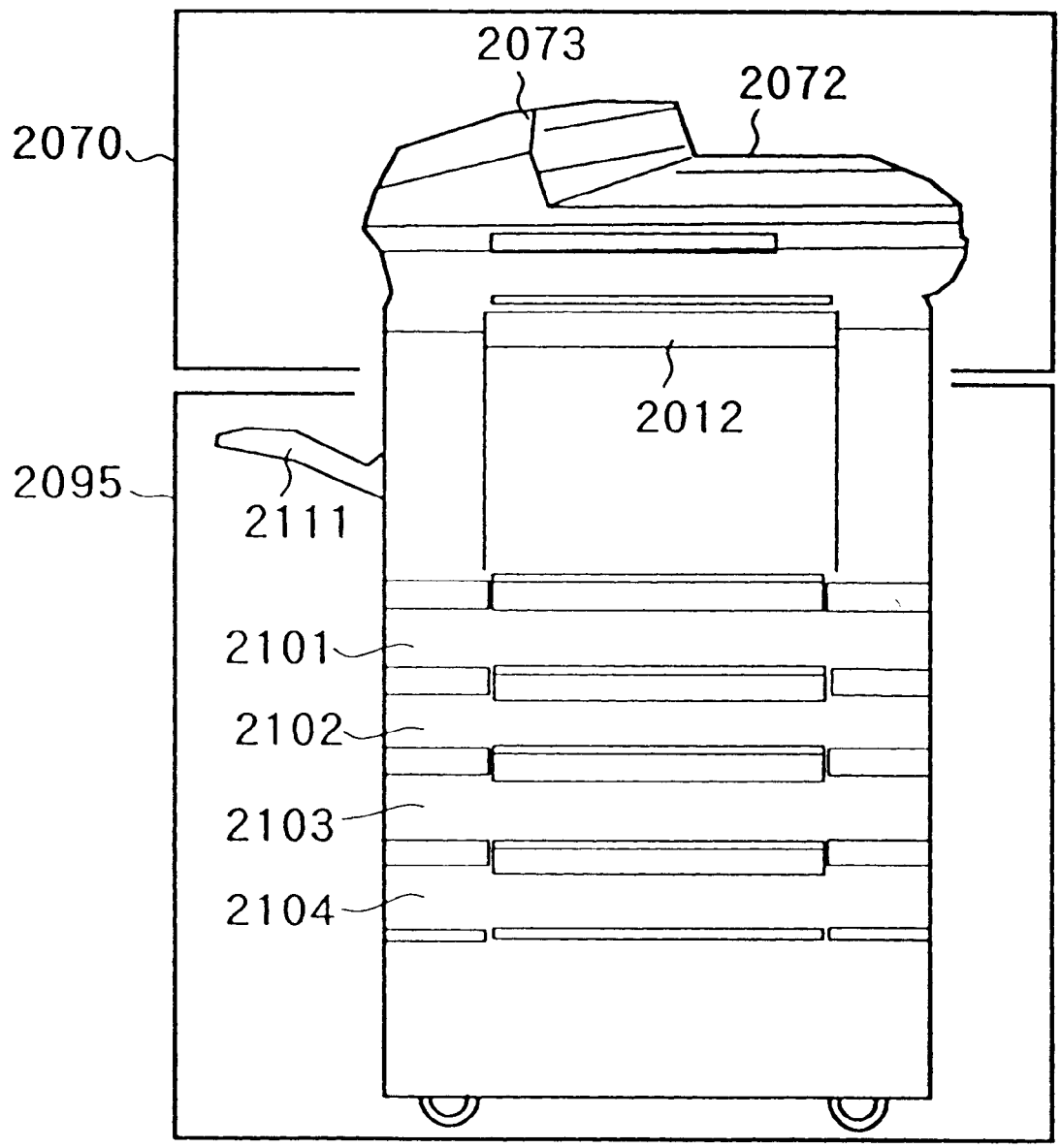
FIG. 2 is a front view showing the external appearance of the combined apparatus to which the present invention is applied.

FIG. 2 is a front view showing the external appearance of the integrated apparatus. The scanner 2070, which is the image input device, illuminates a document and scans the document using a CCD line sensor (not shown) to convert the scanned image an electric signal representing raster-image data. The document is placed on a tray 2073 of an image feeder 2072. When the user of the apparatus uses the control panel 2012 to instruct the apparatus to start reading the document, the CPU 2001 of the controller 2000 applies a command to the scanner 2070. The feeder 2072 feeds in the document one sheet at a time so that the document images are read.

The printer 2095 serving as the image output device converts the raster-image data 2096 to an image on a recording medium such as paper. Any printing technique may be used in the printer. Examples are electrophotography, which employs a photosensitive drum or belt, or an ink-jet technique, which forms an image directly on paper by jetting ink from an array of micron-ozzles. The printing operation is started up in response to a command from the CPU 2001 of the controller 2000. The printer 2095 possesses a plurality of supply bins that make it possible to select printing media of different sizes or orientations, as well as cassettes 2101, 2102, 2103 and 2104 corresponding to these bins. A drop tray receives the printing medium on which printing has been completed.

Control panel

Figure 3:
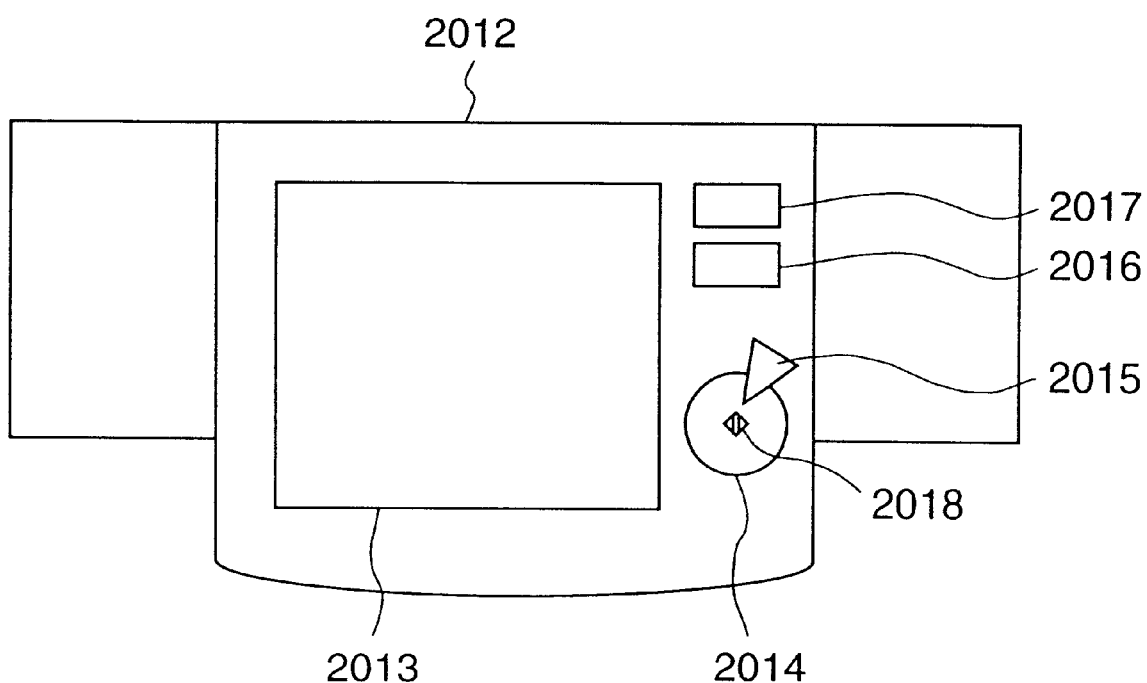
FIG. 3 is a diagram showing the external appearance of a control panel.

FIG. 3 shows an example of the external appearance of the control panel 2012. An LCD display unit 2013 includes a touch-sensitive panel affixed to a liquid crystal display and displays a screen for operating the system. Further, if displayed keys are pressed, the corresponding position information is sent to the controller CPU 2001. A start key 2014 is used to start the reading of a document image. Provided at the center of the start key 2014 is a two-color (green and red) LED 2018 the color of which indicates whether the start key 2014 is operable. A stop key 2015 is for halting an operation that is currently in progress. An ID key 2016 is used when the user inputs a user ID. A reset key 2017 is used to initialize settings from the control panel.

Scanner image processor

Figure 4:
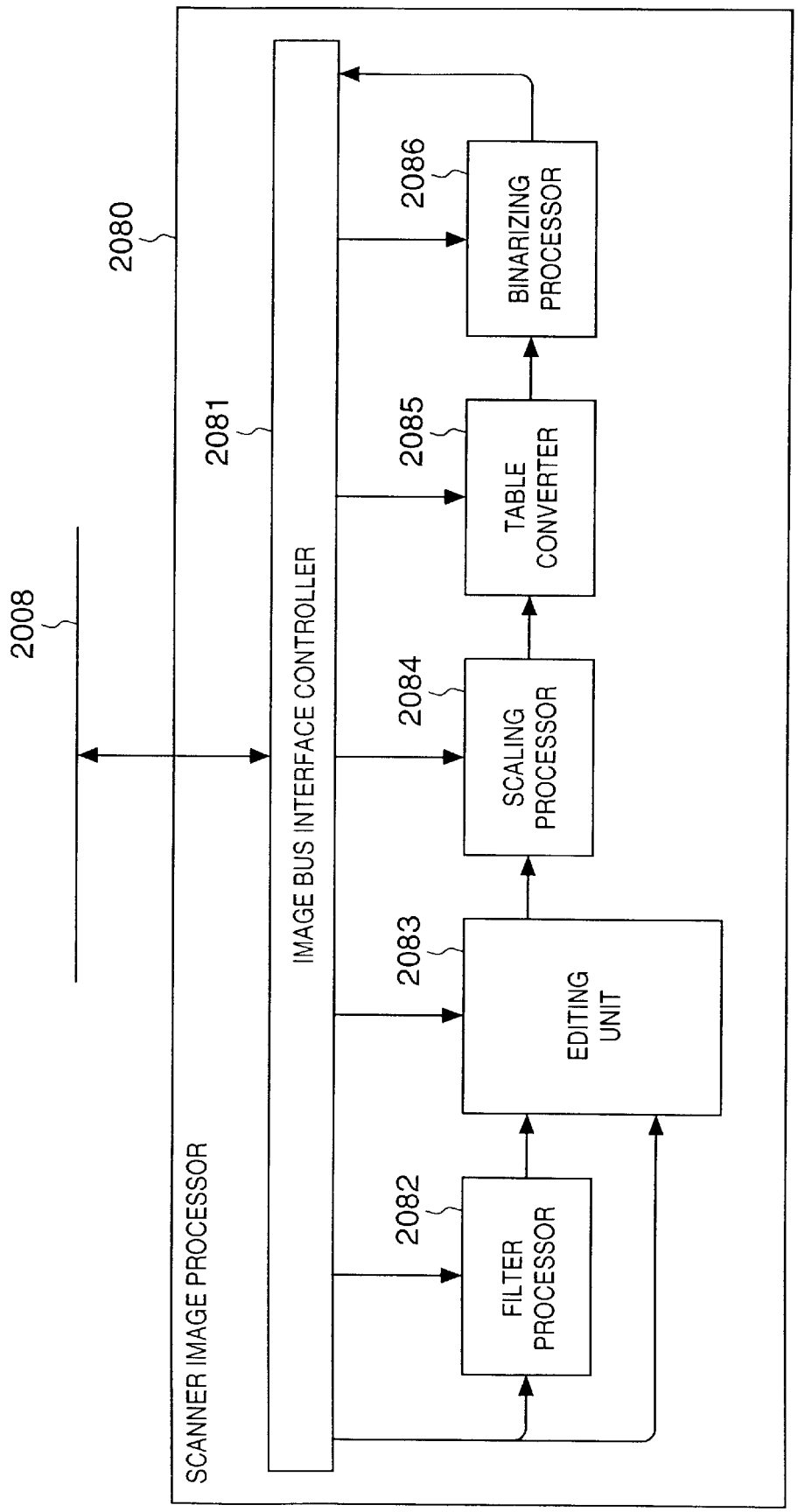
FIG. 4 is a block diagram showing an image processor of a scanner.

FIG. 4 shows the construction of the scanner image processor 2080. An image bus interface controller 2081 connects to the image bus 2008 and controls the bus access sequence, controls each device within the scanner image processor 2080 and generates timing. A filter processor 2082 is a spatial processor for executing a convolution operation. An editing unit 2083 recognizes a closed area, namely an area that has been enclosed by a marker pen, from the input image data, and subjects the image data in this closed area to image manipulation processing such as shadowing, hatching and negative-positive reversal.

A scaling processor 2084 performs enlargement and reduction by executing interpolation in the main-scan direction of the raster image in a case where resolution of the read image can be changed. With regard to scaling in the sub-scan direction, this is carried out by changing the speed at which the image reading line sensor (not shown) is scanned. A table conversion unit 2085 effects a table conversion to convert image data, which is read luminance data, to density data. A binarizing processor 2086 binarizes multilevel grayscale image data by error-diffusion processing or screen processing.

Image data the processing of which has been completed is transferred on the image bus again via the image bus interface controller 2081.

Printer image processor

Figure 5:
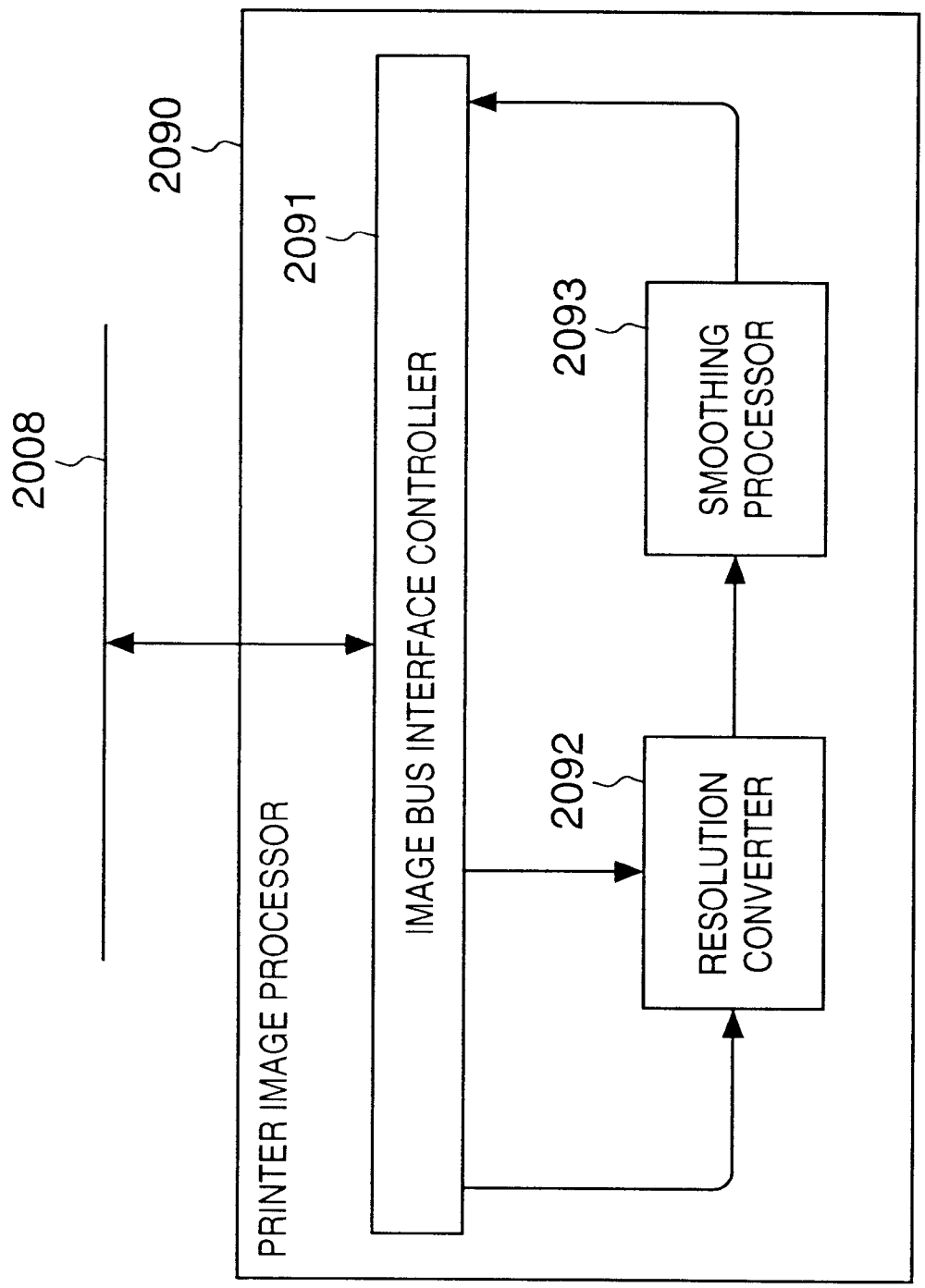
FIG. 5 is a block diagram showing an image processor of a printer.

FIG. 5 shows the construction of the printer image processor 2090. An image bus interface controller 2091 connects to the image bus 2008 and controls the bus access sequence, controls each device within the printer image processor 2090 and generates timing. A resolution converter 2092 executes a resolution conversion to convert the resolution of image data, which has been received from the LAN 2011 or WAN 2051, to the resolution of the printer 2095. A smoothing processor 2093 executes processing so as to smoothen jaggies (jaggedness which appears at edges of diagonal lines and the like) after the resolution conversion.

CODEC

Figure 6:
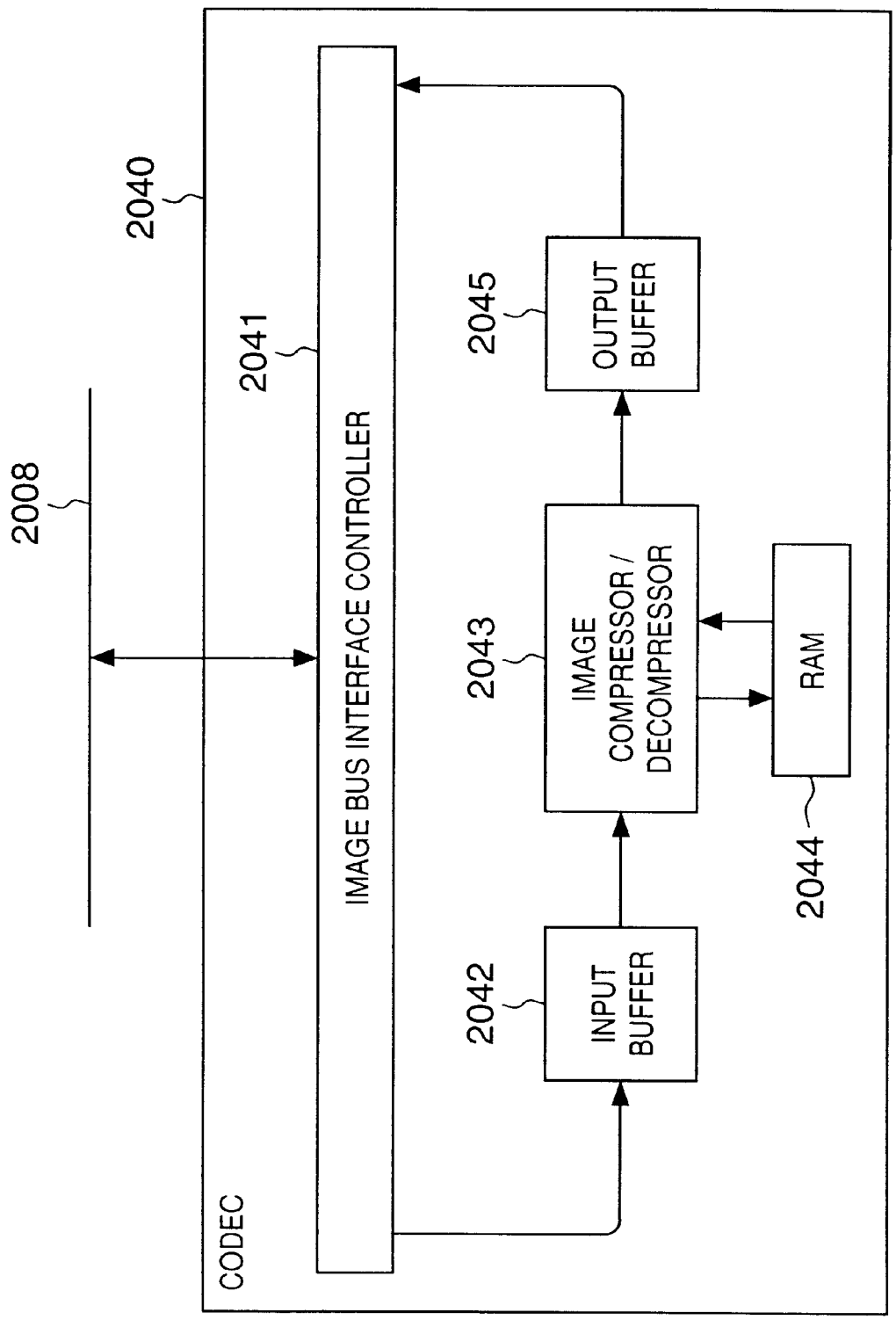
FIG. 6 is a block diagram of a CODEC.

FIG. 6 shows the construction of the CODEC 2040. An image bus interface controller 2041 connects to the image bus 2008 and controls the bus access sequence, controls timing for performing an exchange of data with an input buffer 2042 and output buffer 2045 and controls a mode setting with regard to an image compressor/decompressor 2043. In the present invention, the compression of data is treated as encoding and the decompression of data is treated as decoding. Processing executed by the CODEC 2040 will now be described.

The image bus interface controller 2041 is set up for image compression control from the CPU 2001 via the image bus 2008. In accordance with this set up, the image bus interface controller 2041 subjects the image compressor/decompressor 2043 to a setting necessary for image compression (e.g., MMR compression, JBIG decompression, etc.). After the set-up is made, the CPU 2001 permits the image bus interface controller 2041 to transfer image data again. In accordance with such permission, the image bus interface controller 2041 starts the transfer of image data from the RAM 2002 or from each device on the image bus 2008.

The image data received is stored temporarily in the input buffer 2042 and the image is transferred at a fixed speed in conformity with the image data requirement of the image compressor/decompressor 2043. At this time the input buffer 2042 determines whether the image data can be transferred between the image bus interface controller 2041 and the image compressor/decompressor 2043. In a case where it is impossible to read in image data from the image bus 2008 and to write image data to the image compressor/ decompressor 2043, the input buffer 2042 exercises control in such a manner that data is not transferred (such control is referred to as "handshake control").

The image compressor/decompressor 2043 stores the accepted image data in the RAM 2044 temporarily. The reason for this is that several lines of data are required, depending upon the type of image compression processing to be executed, when image compression is carried out. Unless several lines of image data are prepared, image compression of the initial line cannot be carried out. The image data that has undergone compression is sent to the output buffer 2045 immediately.

Handshaking between the image bus interface controller 2041 and the image compressor/decompressor 2043 takes place in the output buffer 2045, which then transfers the image data to the image bus interface controller 2041. The latter transfers this transferred and compressed (or decompressed) image data to the RAM 2002 or to each device on the image bus 2008. This series of processes is repeated until there are no longer any processing requests from the CPU 2001 (which occurs when processing of the required number of pages has ended) or until there is a halt request from the image compressor/decompressor 2043 (as when an error occurs at the time of compression or decompression).

Image rotation unit

Figure 7:
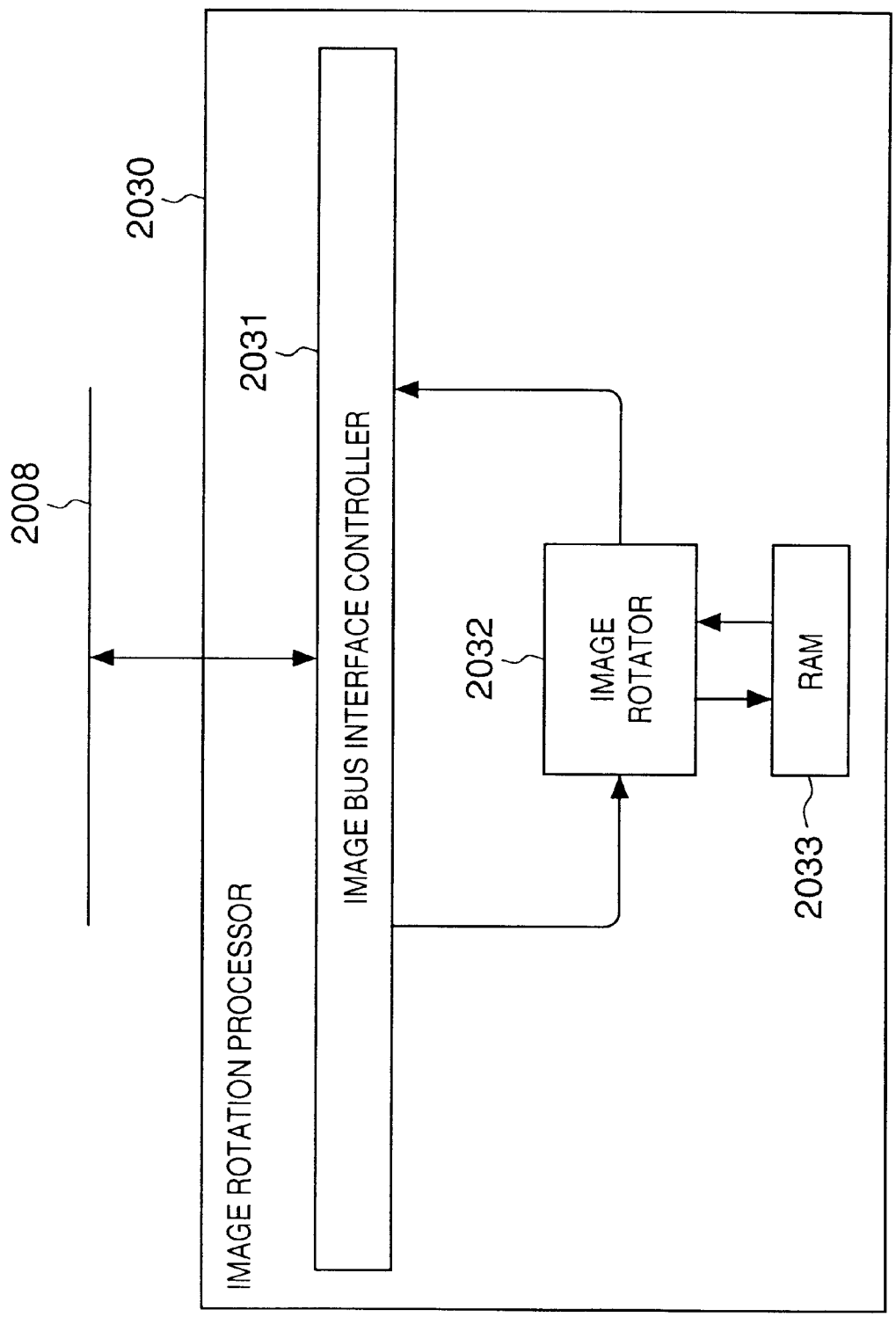
FIG. 7 is a block diagram of an image rotation unit.

FIG. 7 illustrates the construction of the image rotation unit 2030. An image bus interface controller 2031 connects to the image bus 2008 and controls the bus access sequence, controls the mode, etc., to which an image rotator 2032 is set, and controls timing for the transfer of image data to the image rotator 2032. The processing executed by the image rotator 2032 will now be described.

The image bus interface controller 2031 is set up for image rotation control from the CPU 2001 via the image bus 2008. In accordance with this set up, the image bus interface controller 2031 subjects the image rotator 2032 to settings necessary for image rotation (e.g., image size, direction and angle of rotation, etc., are set). After the necessary settings are made, the CPU 2001 permits the image bus interface controller 2031 to rotate the image data. In accordance with such permission, the image bus interface controller 2031 starts the transfer of image data from the RAM 2002 or from each device on the image bus 2008. It is assumed that the width of the image bus 2008 is 32 bits, that the size of the image to be rotated is 32×32 bits, and that when the image data is transferred on the image bus 2008, the image transfer is made in units of 32 bits. (The image is assumed to be binary image.)

Figure 8:
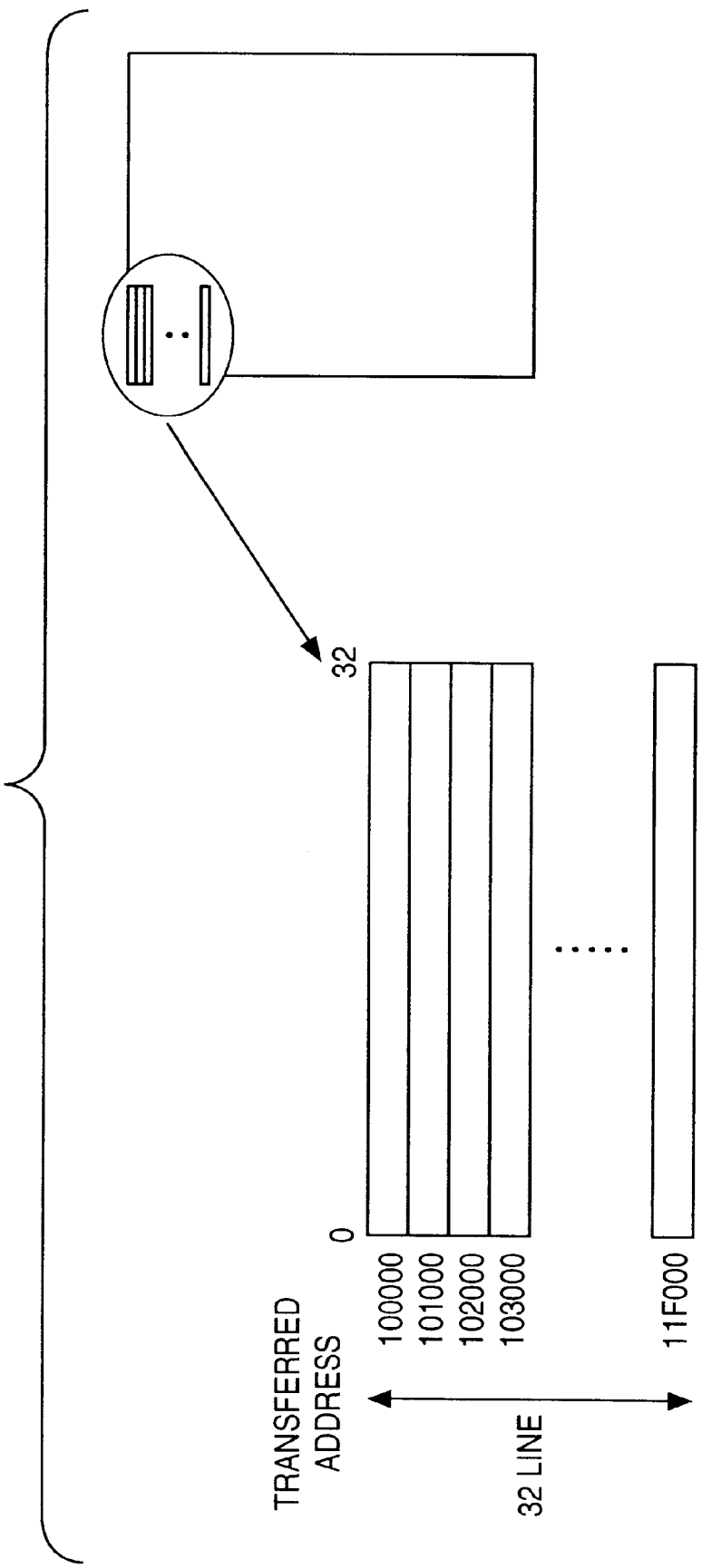
FIG. 8 is a diagram useful in describing image rotation processing.
Figure 9:
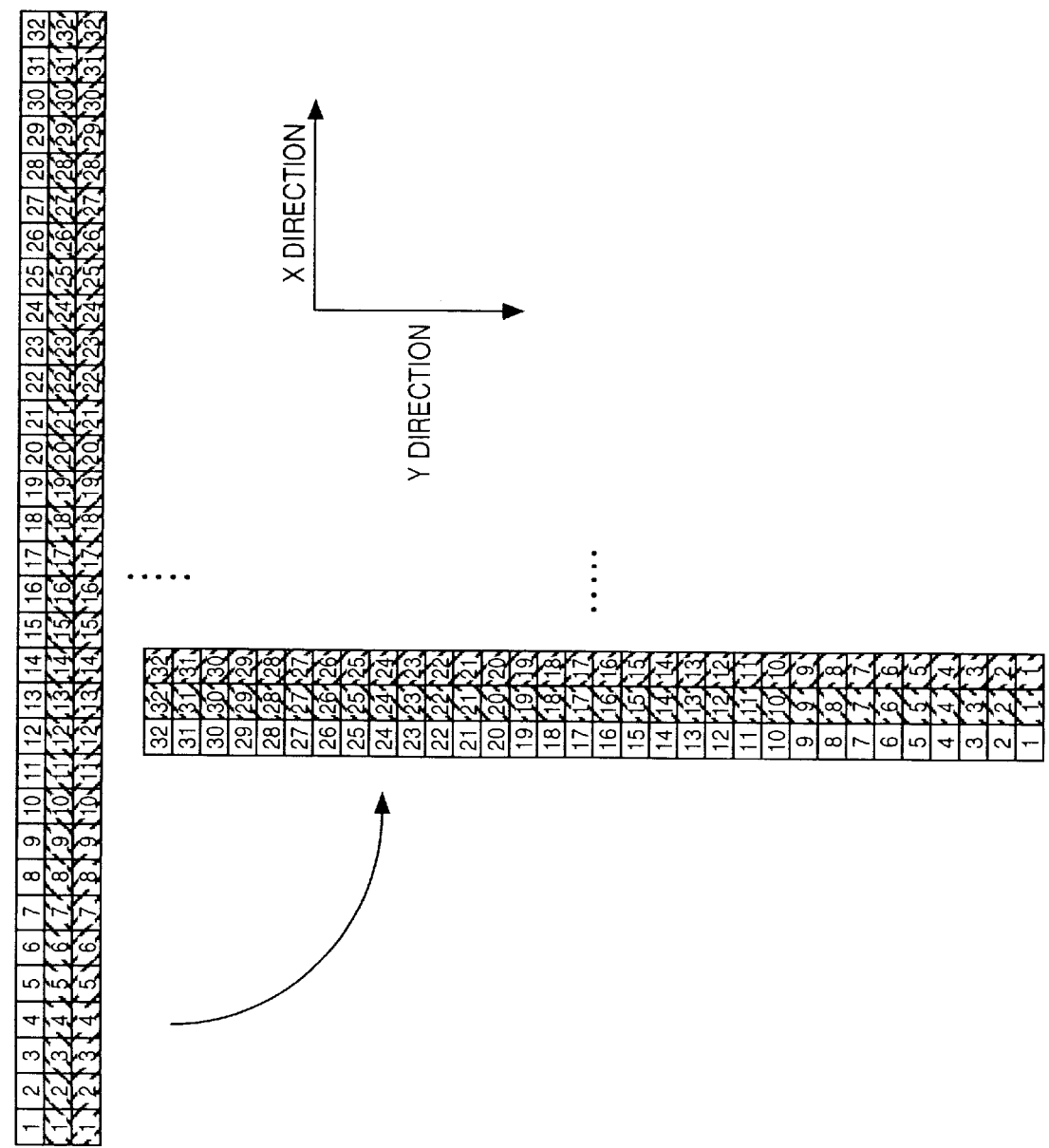
FIG. 9 is a diagram useful in describing image rotation processing.

In order to thus obtain an image of 32×32 bits, the above-mentioned transfer in 32-bit units must be executed 32 times and it is required that the image data be transferred from non-contiguous addresses (see FIG. 8). The image data transferred by non-contiguous addressing is written to the RAM 2033 in such a manner that it will be rotated through the desired angle when it is read out. For example, if rotation is 90° in the counter-clockwise direction, the initially transferred 32-bit image data is written in the Y direction in the manner shown in FIG. 9. At read-out, the image data is read out in the X direction, whereby the image is rotated.

Upon completion of 32×32—bit image rotation (writing to the RAM 2033), the image rotator 2032 reads the image data out of the RAM 2033 through the above-described method and transfers the image to the image bus interface controller 2031.

The image bus interface controller 2031 that has received the rotated image data transfers the data to the RAM 2002 or to each device on the image bus 2008 through contiguous addressing. This series of processes is repeated until there are no longer any processing requests from the CPU 2001 (which occurs when processing of the required number of pages has ended).

Device interface

Figure 10:
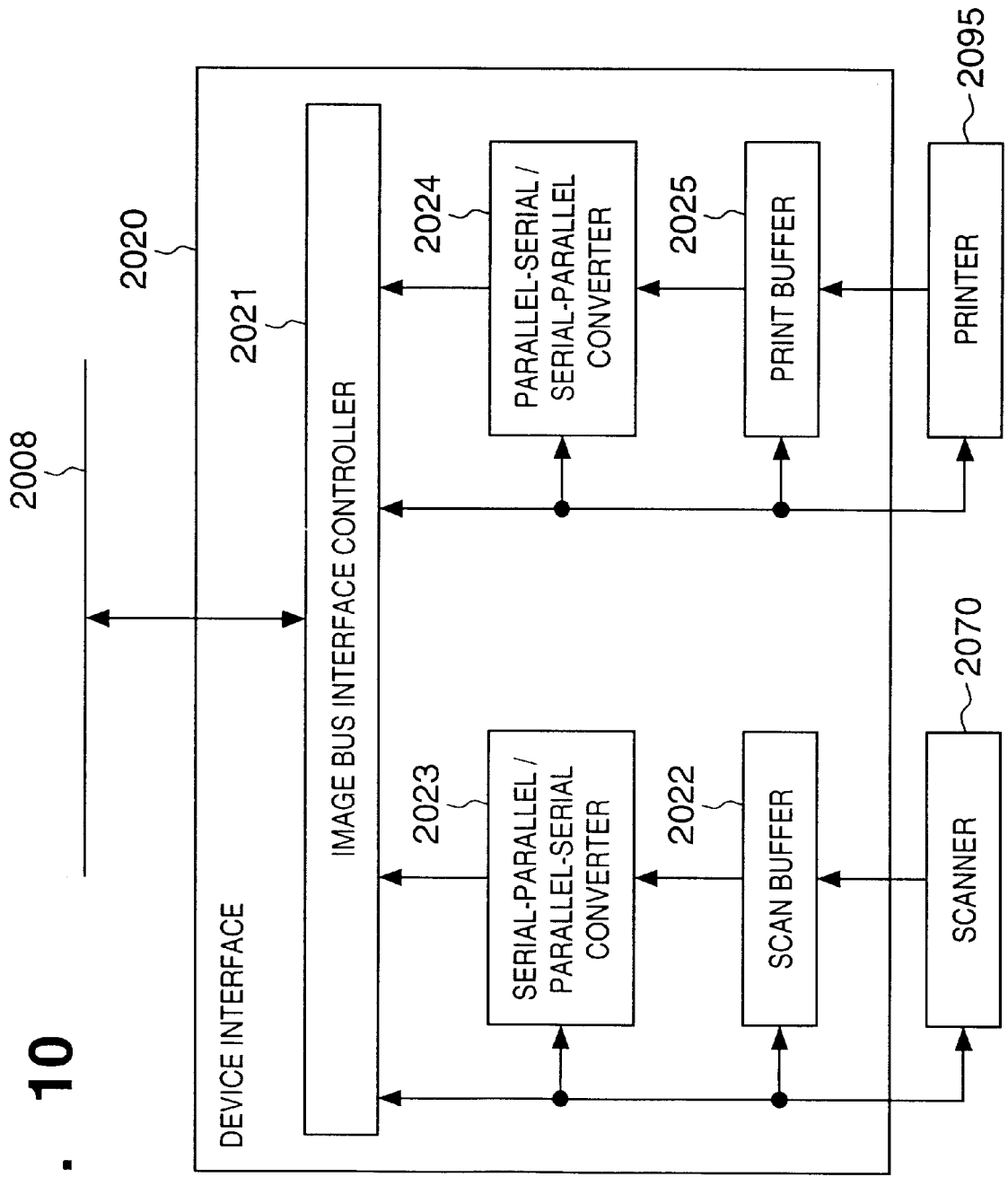
FIG. 10 is a block diagram of a device interface.

FIG. 10 illustrates the construction of the device interface 2020. An image bus interface controller 2021 connects to the image bus 2008 and controls the bus access sequence, controls each device in the device interface 2020 and generates timing. In addition, the image bus interface controller 2021 generates control signals applied to the external scanner 2070 and printer 2095. A scan buffer 2022 temporarily stores the image data sent from the scanner 2070 and outputs the synchronized image data to the image bus 2008.

The image data that has been stored in the scan buffer 2022 is placed in numerical order or disassembled by a serial/parallel parallel/serial converter 2023, whereby there is achieved a conversion to a data width of image data capable of being transferred to the image bus 2008. Image data that has been transferred from the image bus 2008 is decomposed or placed in numerical order by a parallel/serial serial/parallel converter 2024, whereby there is achieved a data width of image data capable of being stored in a print buffer 2025. The print buffer 2025 temporarily stores image data sent from the image bus 2008 and outputs the synchronized image data to the printer 2095.

Processing at the time of image scanning will now be described.

Image data sent from the scanner 2070 is stored in the scan buffer 2022 in sync with a timing signal sent from the scanner 2070. If, in a case where the image bus 2008 is a PCI bus, image data in excess of 32 bits has entered the buffer, 32 bits of the image data is sent from the buffer to the serial/parallel parallel/serial converter 2023 in first-in first-out fashion, the data is thereby converted to 32-bit image data and the image data is transferred on the 2008 through the image bus interface controller 2021. Further, in a case where the image bus 2008 is in compliance with IEEE 1394, the image data in the buffer is sent from this buffer to the serial/parallel parallel/serial converter 2023 in first-in first-out fashion, the data is thereby converted to serial image data and the serial image data is transferred on the image bus 2008 through the image bus interface controller 2021.

Processing at the time of image printing will now be described.

In a case where the image bus 2008 is a PCI bus, 32-bit image data sent from the image bus is received by the image bus interface controller, sent to the parallel/serial serial/parallel converter 2024, disassembled into image data having the number of bits that can be input to the printer 2095 and then stored in the print buffer 2025. In a case where the image bus 2008 is in compliance with IEEE 1394, serial image data sent from the image bus is received by the image bus interface controller, sent to the parallel/serial serial/parallel converter 2024, converted to image data having the number of bits that can be input to the printer 2095 and then stored in the print buffer 2025. Then, in sync with a timing signal sent from the printer 2095, the image data in the buffer is sent to the printer 2095 in first-in first-out fashion.

Network system

Figure 11:
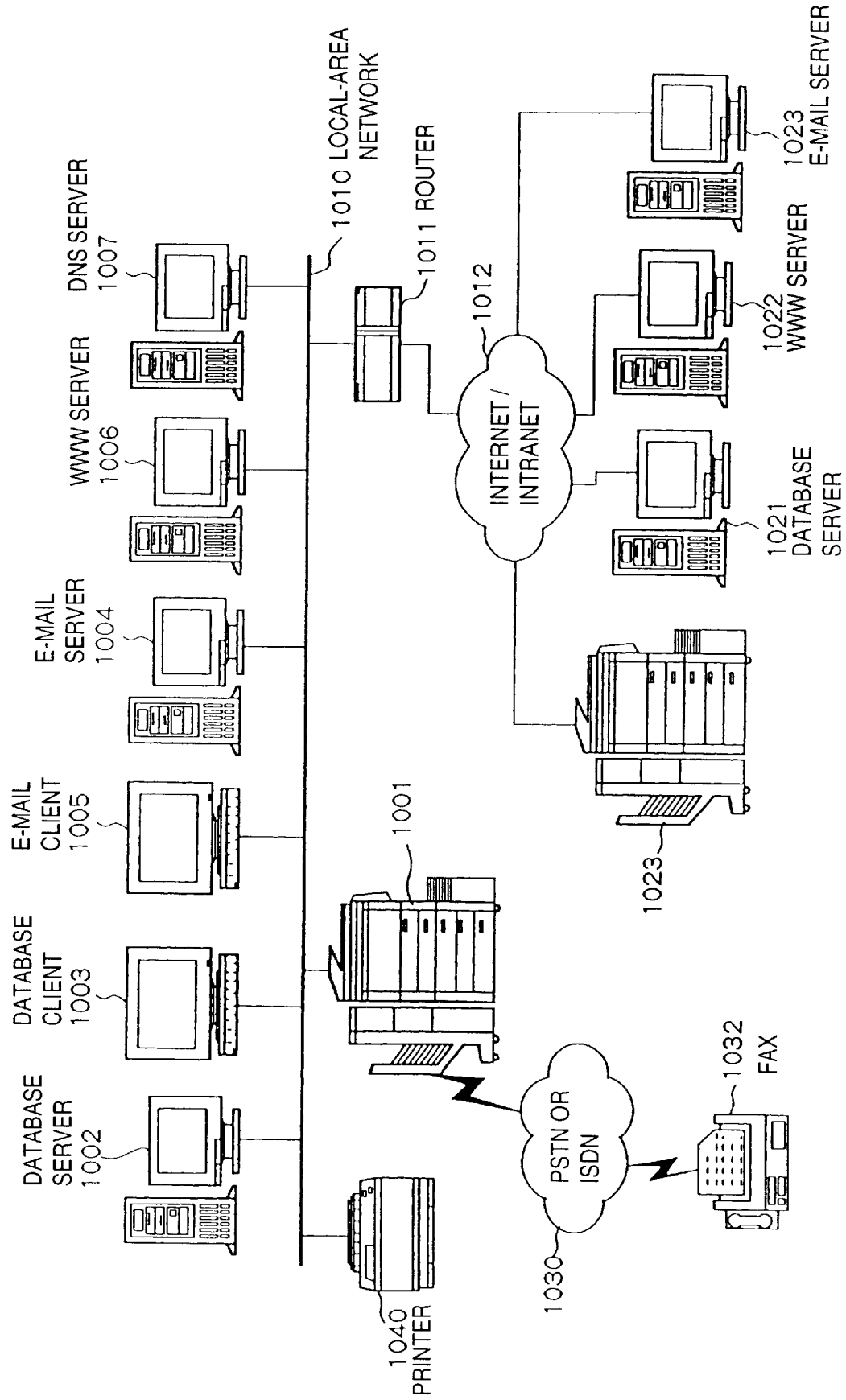
FIG. 11 is a diagram showing an example of the configuration of a network system having an apparatus to which the present invention is applied connected thereto.

FIG. 11 illustrates an example of the configuration of a system in a case where an integrated multifunction apparatus 1001 to which the CODEC of this invention is applied is connected to a network. The apparatus 1001 comprises a scanner and printer, described later. An image read in from the scanner can be sent to a LAN 1010, and an image received from the LAN 1010 can be printed out by the printer. Further, an image read in from the scanner can be transmitted by facsimile transmission means (not shown) to a PSTN or ISDN (1030), and an image received from the PSTN or ISDN can be printed out by the printer. A database server 1002 manages binary images and multilevel images, which have been read in by the combined apparatus 1001, as a database. A database client 1003 of the database server 1002 is capable of browsing/retrieving image data that has been stored in the database 1002.

An electronic mail server 1004 is capable of managing an image, which has been read by the combined apparatus 1001, as an attachment to e-mail. An electronic mail client 1005 is capable of receiving and browsing main that has been accepted by the e-mail server 1004, and of transmitting e-mail. A WWW server 1006 supplies the LAN with HTML text. HTML text provided by the WWW server 1006 can be printed by the combined apparatus 1001. A router 1011 connects the LAN 1010 to the Internet or to an intranet. Devices similar to the database server 1002, WWW server 1006, electronic mail server 1004 and combined apparatus 1001 are connected to the Internet/intranet as devices 1021, 1022, 1023 and 1024. The integrated apparatus 1001 is capable of transmitting data to and receiving data from a facsimile machine 1031. Further, a printer 1040 is connected on the LAN 1010 and is capable of printing out images read by the combined apparatus 1001.

[Software]

Figure 12:
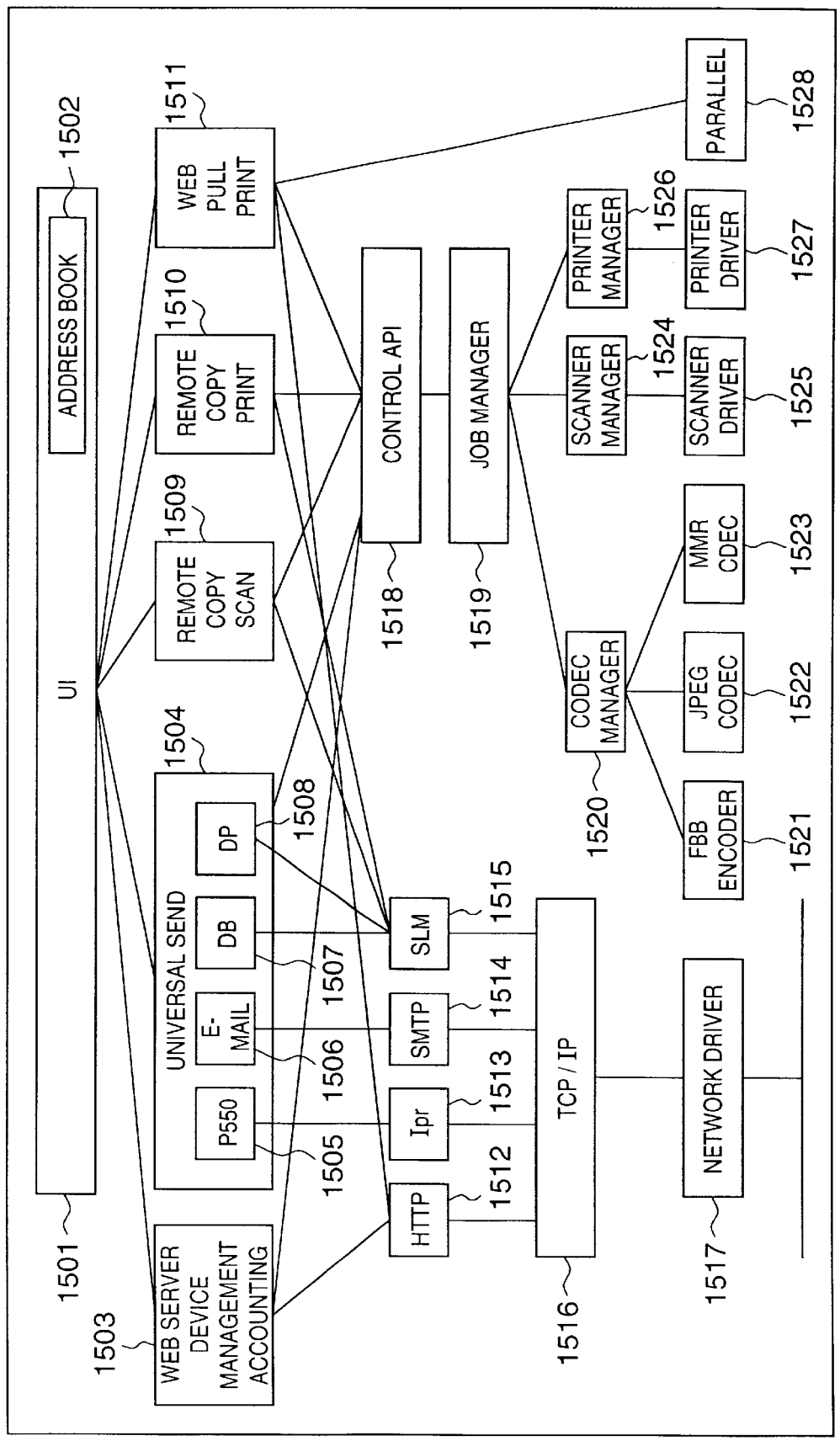
FIG. 12 is a block diagram showing the overall organization of software of a combined apparatus to which the present invention is applied.

FIG. 12 is a block diagram showing the modular structure of the software for the integrated apparatus shown in FIG. 1.

A module 1501, which controls the UI (user interface), acts as the intermediary with the apparatus when the apparatus is operated and configured. This module requests the transfer of input information to various modules, described later, or sets data.

An address book module 1502 is a database module for managing the addressee and communication destination of data. Data can be added to, deleted from and acquired from the address book by an operation performed at the UI 1501, and the address book is used as means for providing each module (described below) with data address and communication-destination information in response to an operation performed by the operator.

A Web-server module 1503 is used to give notification of management information of the combined apparatus in response to a request from a Web client (not shown). The management information is acquired via a control API 1518 (described later) and communicated to the Web client via an HTTP 1512, TCP/IP 1516 and network driver 1517, described later.

A universal send module 1504 controls the distribution of data. Data that has been designated by the operator using the UI 1501 is distributed to a communication (output) destination designated by the operator is similar fashion. In a case where the generation of distributed data using the scanner function of this apparatus has been designated by the operator, the apparatus is operated via the control API 1518 (described later) to generate the data.

A module 1505 is run when the printer is designated within the universal send module 1504 as the output destination.

A module 1506 is run when an e-mail address is designated within the universal send module 1504 as the communication destination.

A module 1507 is run when a database is designated within the universal send module 1504 as the output destination.

A module 1508 is run when an integrated apparatus similar to this apparatus is designated within the universal send module 1504 as the output destination.

A remote copy scan module 1509, which uses the scanner function of this integrated apparatus, adopts another integrated apparatus connected by a network or the like as the output destination and executes processing the same as that of the copy function implemented by this integrated apparatus.

A remote copy print module 1510, which uses the printer function of this integrated apparatus, adopts another integrated apparatus connected by a network or the like as the input source and executes processing the same as that of the copy function implemented by this integrated apparatus.

A Web-pull print module 1511 reads out and prints various web-page information from the Internet or intranet.

A module 1512 is used when this integrated apparatus communicates by HTTP. This module provides the Web-server module 1503 and Web-pull print module 1511 with communication by means of the TCP/IP module 1516, described below.

An lpr module 1513 provides the printer module 1505 within the universal send module 1504 with communication by means of the TCP/IP module 1516.

An SMTP module 1514 provides the e-mail module 1506 within the universal send module 1504 with communication by means of the TCP/IP module 1516.

A salutation manager (SLM) module 1515 provides the database(DB) module 1507, DP module 1508 within the universal send module 1504 and the remote copy scan module 1509 and remote copy print module 1510 with communication by means of the TCP/IP module 1516.

The TCP/IP communication module 1516 provides the above-mentioned modules with network communication by the network driver 1517.

The network driver 1517 is for controlling components physically connected to the network.

The control API 1518 interfaces modules upstream of the universal send module 1504 with modules downstream of a job manager module 1519 (described later), etc. This module reduces the dependency between the upstream and downstream modules and enhances the versatility of these modules.

The job manager module 1519 interprets processes specified by the various modules via the control API 1518 and applies commands to modules set forth below. These modules implement unified management of the hardware processes executed within this integrated apparatus.

A CODEC manager module 1520 manages and controls various types of compression and decompression among the processes specified by the job manager module 1519.

An FBE encoder 1521 compresses, in accordance with an FBE format, data read in by scanning processing executed by the job manager module 1519 and a scanner manager module 1524.

A JPEG CODEC module 1522 performs JPEG compression of read in data and JPEG decompression of print data in the scan processing executed by the job manager module 1519 and scanner manager module 1524 and print processing executed by a print manager module 1526.

An MMR CODEC module 1523 performs MMR compression of read in data and MMR decompression of print data in the scan processing executed by the job manager module 1519 and scanner manager module 1524 and print processing executed by a print manager module 1526.

The scanner manager module 1524 manages and controls scan processing designated by the job manager module 1519.

A scanner driver 1525 is for implementing communication between the scanner manager module 1524 and a scanner unit to which the integrated apparatus is internally connected.

The print manager module 1526 manages and controls print processing designated by the job manager module 1519.

A printer driver 1527 is for interfacing the print manager module 1526 and a printer unit.

A parallel-port driver 1528 provides the interface when the Web-pull print module 1511 outputs data to an output device (not shown) via a parallel port.

Applications

An embodiment of built-in applications according to the present invention will now be described with reference to the drawings.

Figure 13:
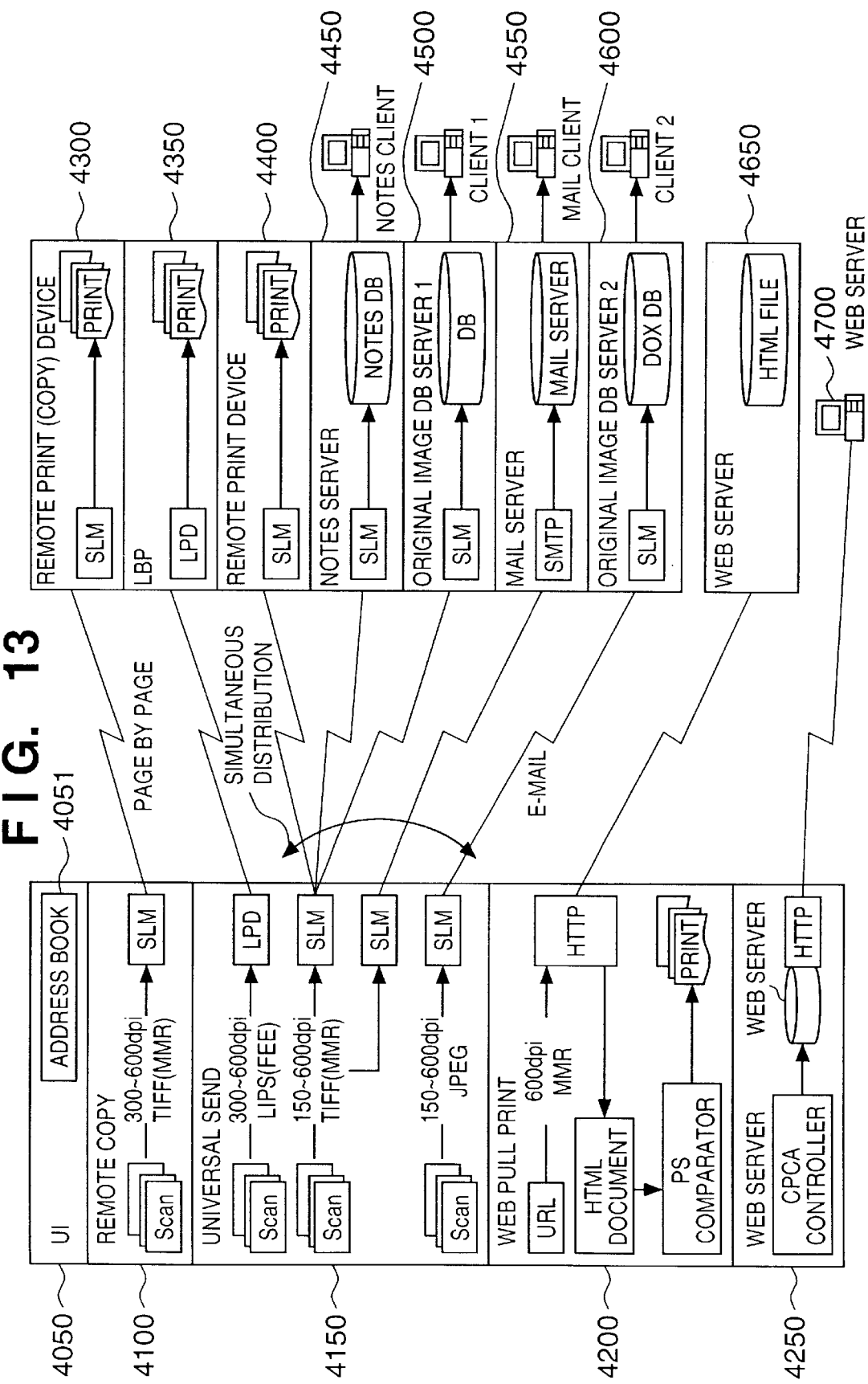
FIG. 13 is a block diagram useful in describing built-in applications for a distribution function.

FIG. 13 is a diagram showing built-in application blocks, which relate to image-data distribution, in the integrated apparatus shown in FIG. 1.

The blocks include a block 4050 indicative of the control-panel application of the present invention (described above with reference to FIG. 3); a block 4100 indicative of the transmitting side of a remote copy application; a block 4150 indicating the transmitting side of broadcast distribution; a block 4200 indicative of the Web-pull module; a block 4250 indicative of the Web server module; a block 4300 indicative of the receiving side (printing side) of remote copy; a block 4350 for receiving and printing, by a general-purpose printer, an image that has been transmitted by broadcast distribution; a block 4400 indicative of the receiving side (printing side) of remote printing; a block 4450 for receiving and storing an image, which has been transmitted by broadcast transmission, by a well-known Notes (registered trademark) server; a block 4500 for receiving and storing, as a binary image, an image that has been transmitted by broadcast distribution; a block 4550 for receiving and storing an image, which has been transmitted by broadcast distribution, by a well-known mail server; and a block 4600 for receiving and storing, as a multilevel image, an image that has been transmitted by broadcast distribution.

A well-known Web server 4650 includes information content, and a well-known Web browser 4700 accesses the Web server, etc., in accordance with the present invention.

The group of applications will now be described in detail with reference to the respective blocks.

User interface application

The details of the user interface (UI) indicated by block 4050 are as set forth earlier. The address book 4051 will be discussed here. The address book is preserved in a non-volatile storage device (non-volatile memory or hard disk, etc.) within the apparatus of the present invention. The features of the devices connected to the network are written in the address book. The following items are set forth included in the address book:

the formal names and aliases of the devices;
the network addresses of the devices;
the network protocols capable of being executed by the devices;
the document formats capable of being implemented by the devices;
the types of compression capable of being executed by the devices;
the image resolutions of the devices;
the paper sizes capable of being supplied and information concerning the paper supply bins in case of a printer; and
the names of folders capable of storing documents in case of a server (computer).

The applications described below are such that the features of broadcast destinations are identified by information that has been written in the address book 4051.

Further, the address book is capable of being edited and makes it possible to download and use what has been stored in the server computer in the network or to refer to this information directly.

Remote copy application

The remote copy application 4100 identifies, from the address book 4051, information representing resolution achievable by the device specified at the distribution destination, compresses the binary image, which has been read by the scanner, using well-known MMR compression in accordance with the identification made, converts the format of the compressed image to the well-known TIFF (Tagged Image File Format) and then transmits the image to the printer on the network via the SLM 4103. Though the SLM 4103 will not be described in detail, suffice it to say that it is one type of network protocol that includes device control information, etc., and is referred to as a Salutation Manager (or Smart Link Manager).

Broadcast distribution application

The broadcast distribution application 4150 differs from the remote copy application in that this application makes it possible to transmit an image to a plurality of distribution addresses by a single image scan. In addition, distribution destinations are not limited to image output devices such as printers; information can be distributed directly to so-called server computers as well.

Operation will described in accordance with the distribution destinations.

If it is determined from the address book 4051 that the device which is the distribution destination is capable of implemented well-known LIPS functions as printer control commands in accordance with LPD (Line Printer Daemon), which is a well-known network printer protocol, then an image is read in accordance with the image resolution similarly determined from the address book 4051, the image itself is compressed using well-known FBE (First Binary Encoding) in this embodiment, the compressed image is further converted to a LIPS code and the code is transmitted to the device at the destination by LPR, which is a well-known network printer protocol.

If the device which is the destination is capable of communicating in accordance with SLM and is a server device, the server address and the designation of the folder within the server are determined from the address book 4051. Then, in a manner similar to that of the remote copy application, the binary image, which has been read by the scanner, can be compressed using well-known MMR compression, the format of the compressed image can be converted to the TIFF (Tagged Image File Format) and the image can be stored in a specific folder of the network server device via SLM.

The apparatus of this embodiment is such that if the server of the destination device is determined to be capable of processing a multilevel image that has undergone JPEG compression, then, in a manner similar to that of the binary image mentioned above, the read multilevel image can have its format converted to the well-known JIFF using well-known JPEG compression and the image can be stored in a specific folder of the network server device via SLM.

If the device which is the destination of distribution is a well-known e-mail server, then the mail address written in the address book 4051 is identified, the binary image, which has been read by the scanner, is compressed using MMR compression, the format of the compressed image is converted to TIFF and the image is transmitted to the e-mail server using the well-known SMTP (Simple Mail Transfer Protocol) 4153. Subsequent distribution is implemented in accordance with mail server 4550.

Web-pull print application

The Web-pull print application 4200 is not directly related to this embodiment and need not be described.

Web server application

The Web server application 4250 is not directly related to this embodiment and need not be described.

The display screen presented on the control panel will now be described in simple terms.

Control screen

Figure 14:
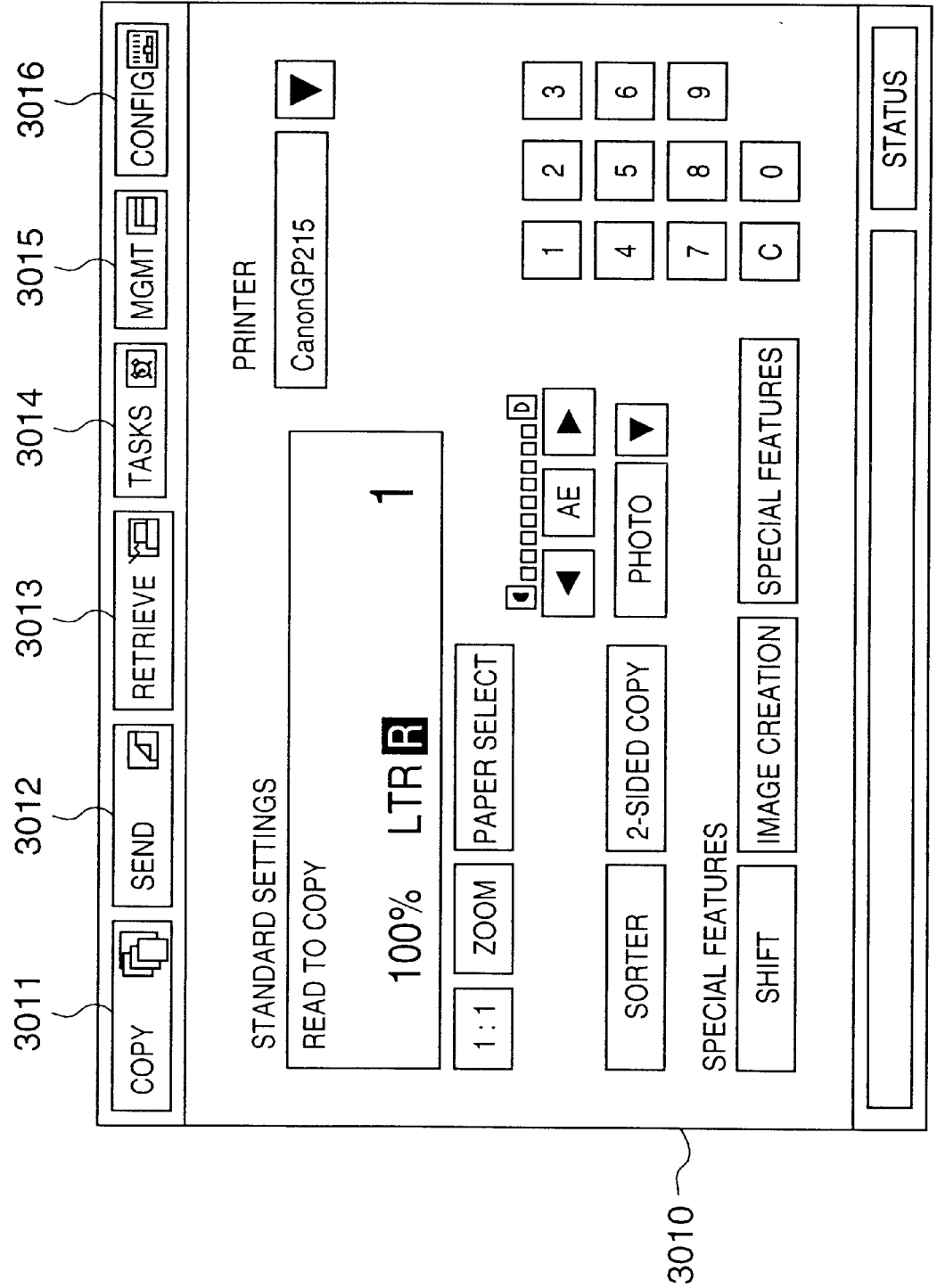
FIG. 14 is a diagram showing a specific example of a display on the control panel.

FIG. 14 shows an example of a display presented on the LCD display unit 2013 of the control panel 2012 illustrated in FIG. 3. FIG. 3 illustrates an example of a display relating to the copy function.

Functions provided by the apparatus of the present invention are divided into six categories, namely COPY, SEND, RETRIEVE, TASKS, MANAGEMENT and CONFIGURATION.

These functions correspond to six main tabs (COPY/SEND/RETRIEVE/TASKS/MGMT/CONFIG) (3011 to 3016) displayed at the top of the control screen (3010) in FIG. 14. A changeover to the screen of each category is performed by pressing the corresponding main tab. In a case where changeover to another category is not allowed, the color in which the main tab is displayed changes and nothing happens when this main tab is pressed.

COPY includes a function for carrying out ordinary document copying using the scanner and printer possessed by the local device, and a function for copying documents using the scanner possessed by the local device and a printer connected on the network.

SEND is a function for transferring a document, which has been placed in the scanner possessed by the local device, to electronic mail, a remote printer, a facsimile machine and a database, and for submitting the document to file transfer (FTP). A plurality of destinations can be specified.

RETRIEVE is a function for acquiring an external document and printing the document using the printer of the local device. The World-Wide Web, electronic mail, file transfer and facsimile can be used as means for acquiring documents.

TASKS is for carrying output the generation and management of tasks for the purpose of automatically processing documents sent from the outside, such as from a facsimile machine or Internet printer, and for retrieving documents periodically.

MANAGEMENT is for managing information such as jobs, address directories, bookmarks, documents and accounts.

CONFIGURATION is for configuring the local device (network configuration, clock settings, etc.).

Device Information Service (DIS)

Figure 15:
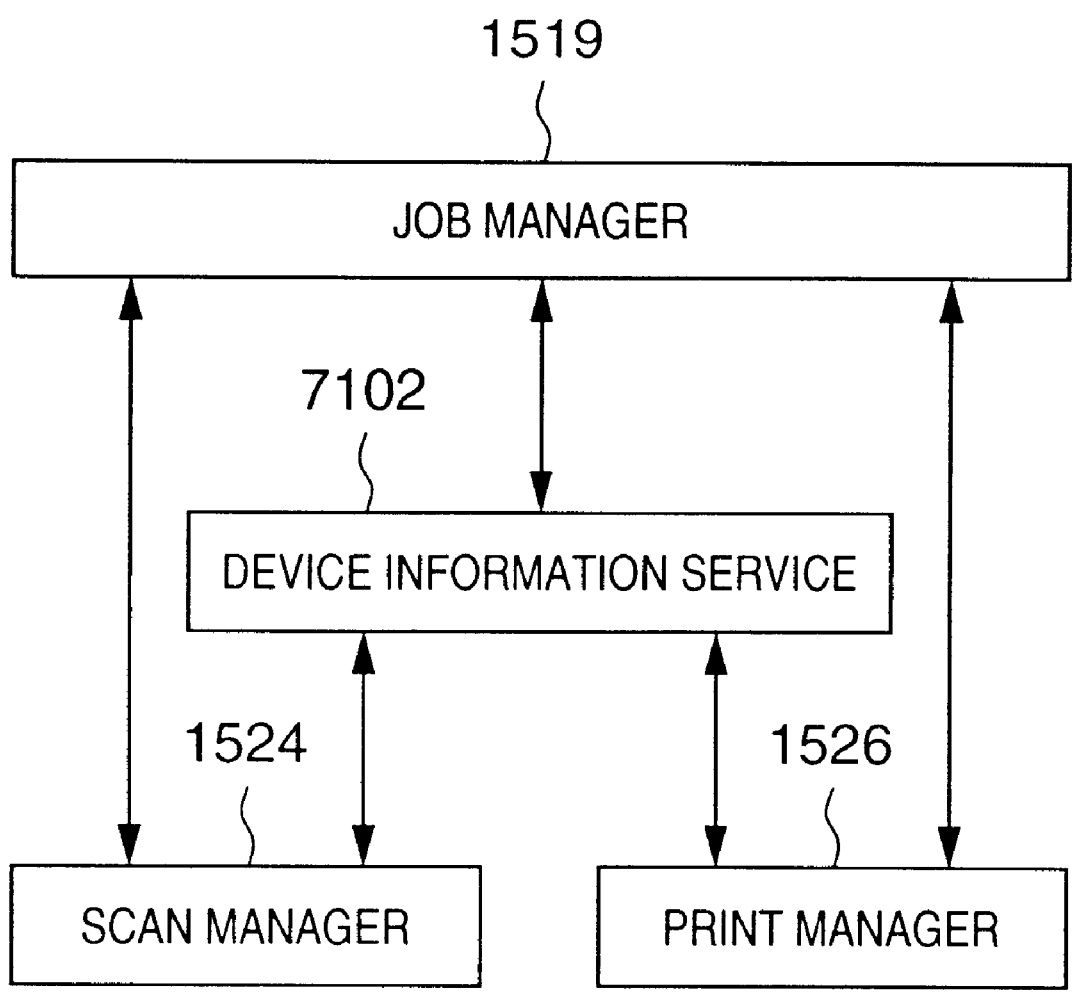
FIG. 15 is a diagram showing the connection relationship between a DIS and a job manager, print manager and scan manager.

A database which retains, in a data format in compliance with the control API, set values regarding jobs in the controller, the functions of devices (scanners, printers, etc.) and billing information, and the interface with this database are defined as a Device Information Service (DSI). FIG. 15 illustrates the relationship between a DIS 7102 and the job manager 1519 and managers 1524, 1526 for scanning and printing.

Basically, dynamic information such as a job start instruction is issued from the job manager 1519 directly to each manager, and static information such as device functions and job content is acquired by referring to the DIS 7102. Static and dynamic information and events from each manager are communicated to the job manager 1519 via the DIS 7102.

In a case where the setting of data in the database of the DIS from each manager and the acquisition of data are performed, the fact that the internal data format of the DIS is in compliance with Control API means that processing is executed to perform a conversion between the data format in compliance with Control API and a data format that can be understood by each manager. For example, in a case where setting of status data is performed from each manager, device-specific information is interpreted, converted to corresponding data defined by Control API and then written to the database of the DIS.

In a case where the setting of data in the database of the DIS from the job manager and the acquisition of data are performed, there is no conversion of data between the job manager and the DIS.

Further, updating of event data in the DIS is performed based upon each item of event information reported by the manager.

Figure 16:
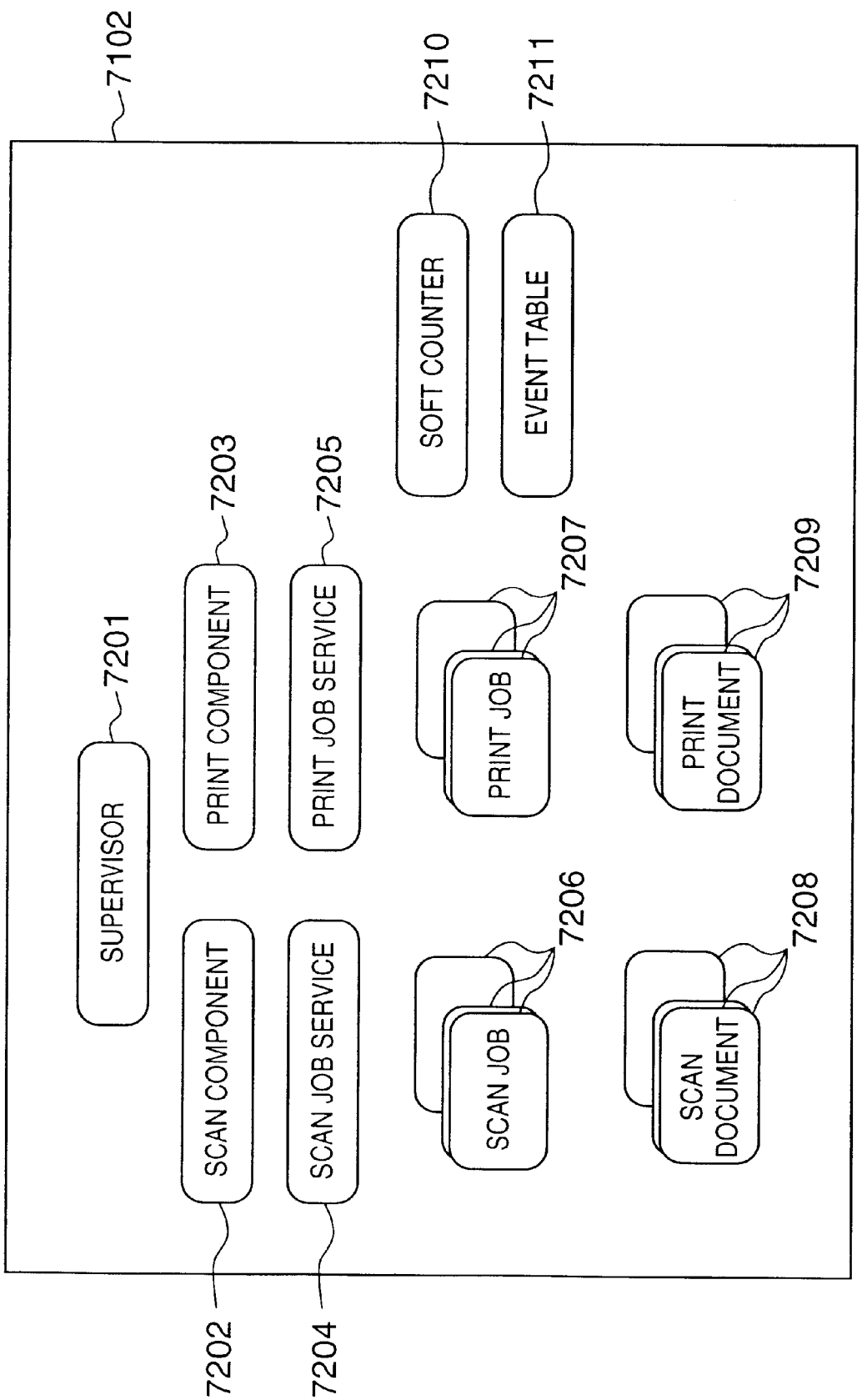
FIG. 16 is a diagram showing a database and a counter within the DIS.

FIG. 16 illustrates various databases stored in the DIS. These databases will now be described.

A supervisor database 7201 stores status and user information regarding all devices. Information such as user IDs and passwords requiring back-up is stored on a hard disk or in a non-volatile storage device such as a back-up memory.

A scan component database 7202 and a print component database 7203 store data in correspondence with each existing component. For example, in case of a device comprising solely a printer, only the print component database will be present. In case of a device equipped with a facsimile function, a fax component database is provided. When initialization is performed, the corresponding managers set the component function and status in each component database.

A scan job service database 7204 and a print job service database 7205 are provided. In a manner similar to that of the component databases, the corresponding managers set the functions capable of being used by devices and their support conditions in these job service databases when initialization is carried out.

Job databases and document databases will be described next. There are provided scan job databases 7206, print job databases 7207, scan document databases 7208 and print document databases 7209.

A job database and a document database are acquired dynamically and initialized by the job manager whenever a job and the document accompanying the jog are generated. The setting of necessary items also is performed. Before the processing of a job starts, each manager reads the item necessary for processing out of the job database and document database and then starts the job. When a job subsequently ends, the databases of these jobs and their accompanying documents are released. Since a job may have more than one document, there are instances where a plurality of document databases are acquired for a certain job.

A database 7211 stores event information communicated from each manager, and a counter table 7210 is for recording the number of scans and the number of print operations of the apparatus.

Events of which notification is given by the manager include status transition of a component, scan processing completion and various errors from the scan manager, as well as status transition of a component, print processing completion, paper jam and opening of a paper cassette from the print manager. Event IDs for identifying these events are determined in advance.

If notification of an event is issued from a manager, the DIS registers the event ID issued to the event database 7211 and, if necessary, detailed data associated with the event. If cancellation of an event is communicated from a manager, the event data for which cancellation has been specified is deleted from the event database 7211.

In a case where event polling from the job manager has taken place, the DIS refers to the event database 7211 and sends back the currently occurring event, ID and, if necessary, detailed data that accompanies this event. If events are not currently occurring, this fact is sent back.

If notification is given of a scan-processing complete event or print-processing complete event, the counter value of the user who is performing the scanning or printing operation is updated. In order that the value of the count based upon this software will not be lost, as when power is inadvertently cut off, the count is written back, whenever the value is updated, to a non-volatile storage device such as a backed-up memory or hard disk.

Scanning operation

Figure 17:
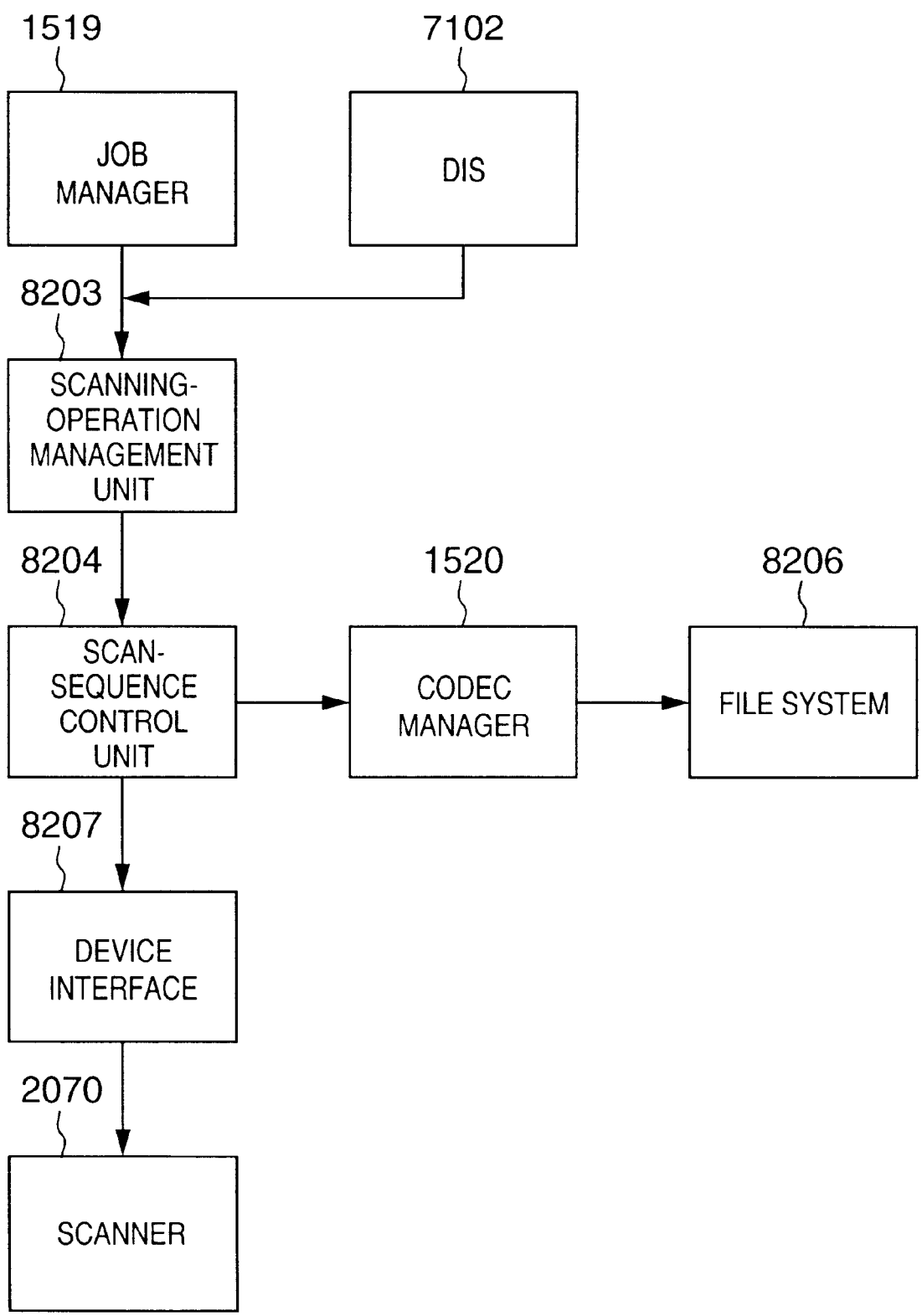
FIG. 17 is a block diagram showing software control in scanning.
Figure 18:
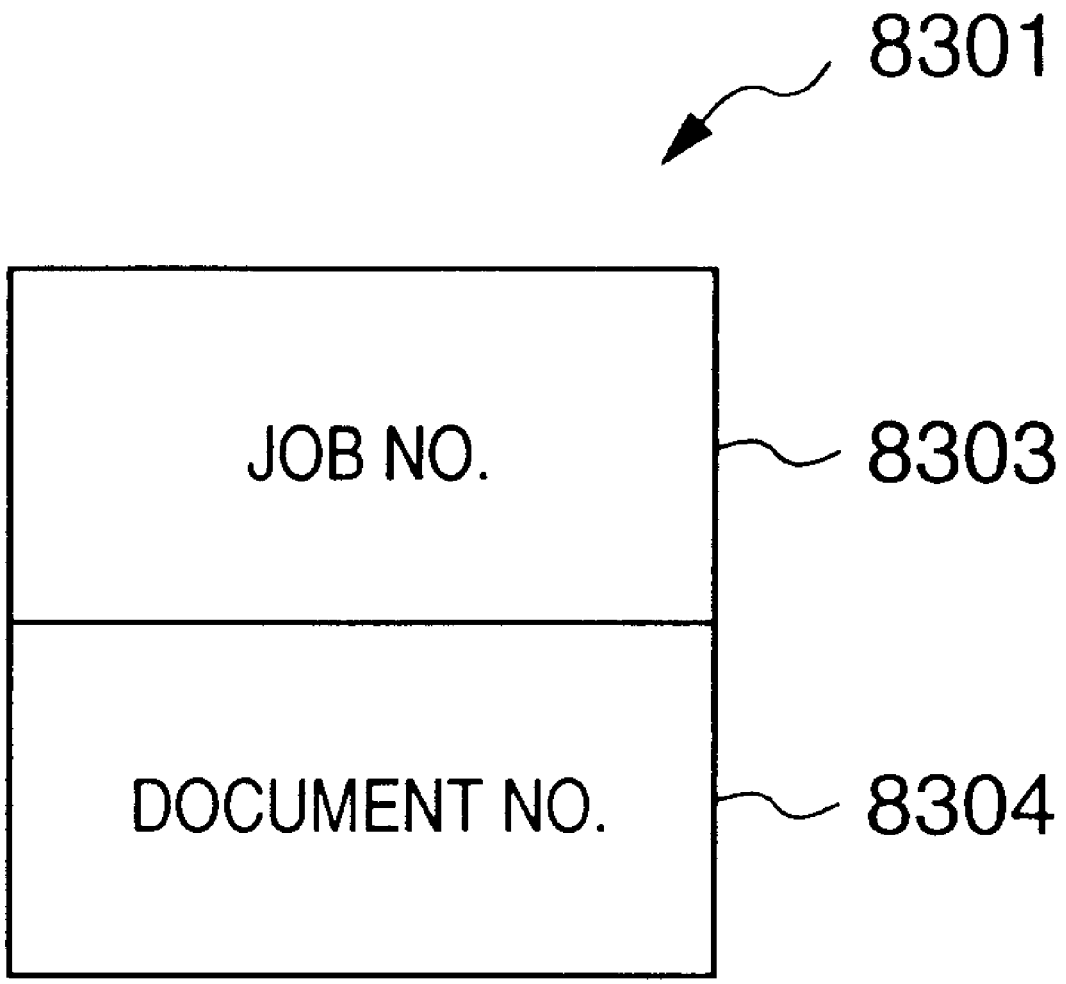
FIG. 18 is a diagrammatic view a parameter table in used in scanning.
Figure 19:
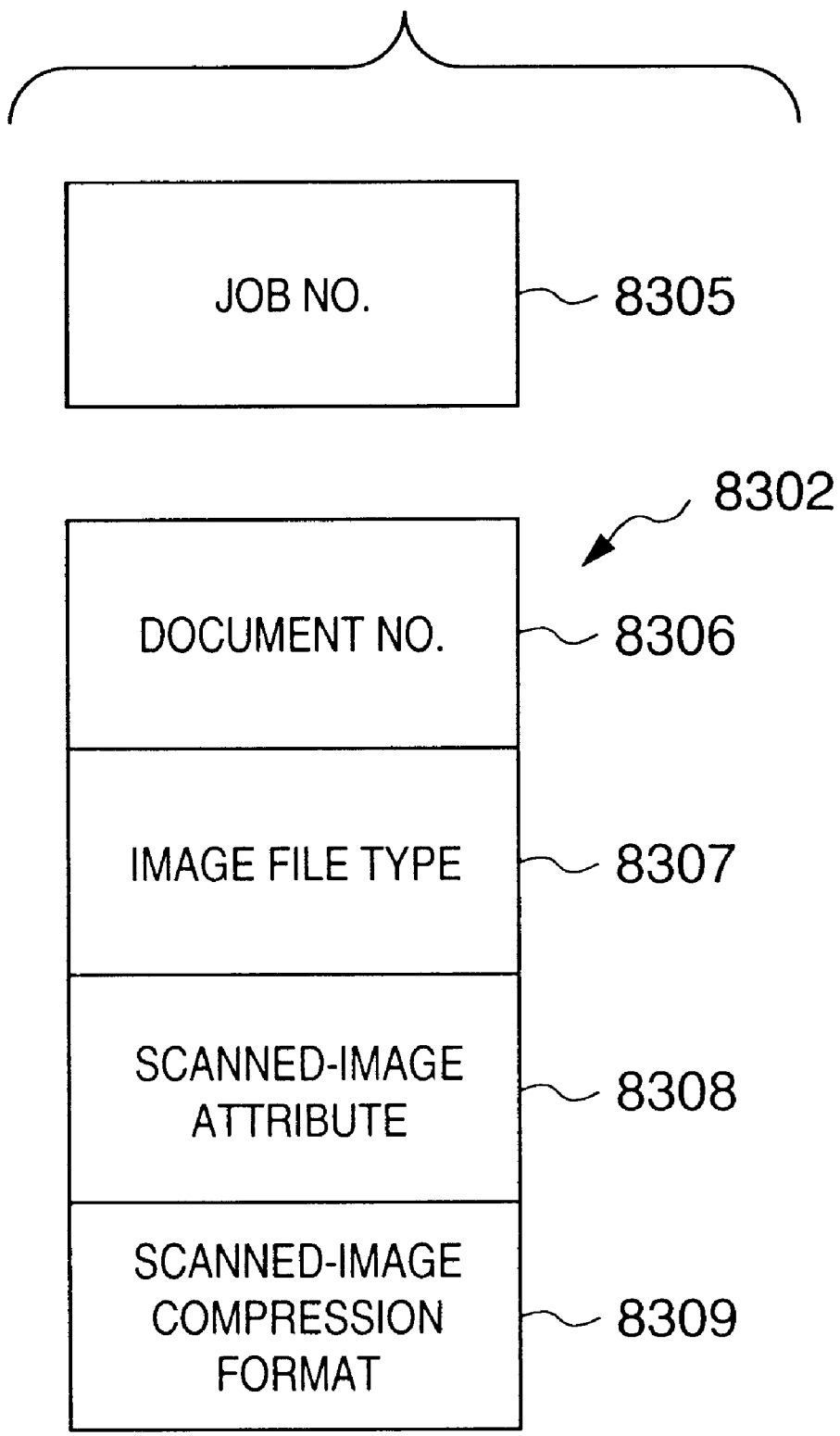
FIG. 19 is a diagrammatic view a parameter table in used in scanning.

FIG. 17 illustrates the software structure relating to scanning. The job manager 1519 has a function for classifying and storing application-level requests. The DIS 7102 stores the parameters necessary for a scanning operation from the application level. Requests from an application are stored in the RAM 2002. A scanning-operation management unit 8203 acquires information, which is necessary for scanning, from the job manager 1519 and DIS 7102. The scanning-operation management unit 8203 acquires table data 8301 consisting of a job number and document number, shown in FIG. 18, from the job manager 1519, and acquires scan parameters 8302, shown in FIG. 19, from the DIS 7102 based upon the table data 8301 consisting of the job number and document number. As a result, scanning is performed based upon scan conditions requested from the application.

The scanning-operation management unit 8203 delivers the scan parameters 8302 acquired from the DIS 7102 to a scan-sequence control unit 8204 in the order of the document numbers. Upon receiving the scan parameters 8302, the scan-sequence control unit 8204 controls a device interface controller 8207 in accordance with the content of scanned image attributes 8308. As a result, by operating the device interface 2020 connected to the image bus 2008 of FIG. 1, a control command is sent to the scanner 2070 via the cable 2071, whereby scanning is carried out. The scanned image is delivered to the device interface 2020 via the cable 2071 and is stored in the RAM 2002 via the bus 2008.

When scanning is completed and an image has been stored in the RAM 2002 via the bus 2008, the scan-sequence control unit 8204 sends a request to the CODEC manager 1520 in order to compress the scanned image that has been stored in the RAM 2002. Upon receiving the request, the CODEC manager module 1520 uses the CODEC 2040 connected to the bus 2008 or the software compression module in the MMR CODEC 1523 to execute compressing in accordance with the designation of a scanned-image compression format 8309 from the scan-sequence control unit 8204. The image compressor/decompressor 2043 stores the compressed image in the RAM 2002 via a bus 2008.

When the CODEC manager module 1520 compresses the scanned image to the format designated by the scanned-image compression format 8309 and stores the compressed image in the RAM 2002, the scan-sequence control unit 8204 converts the compressed scanned image, which has been stored in the RAM 2002, to a file in accordance with an image file type 8307 of the scan parameters 8302. The scan-sequence control unit 8204 requests a file system 8206 to convert the image to a file format designated by the image file type 8307 of the scan parameters 8302. In accordance with the image file type 8307 from the scan-sequence control unit 8204, the file system 8206 converts the compressed image stored in the RAM 2002 to a file and transfers the file to the hard-disk drive 2004 via the bus 2008, whereby the scanned compressed image is converted to a file. When the file system 8206 has stored the image in the form of a file on the hard disk of the hard-disk drive 2004, the scan-sequence control unit 8204 sends back notification of completion of scanning to the scanning-operation management unit 8203. This indicates the completion of processing of one sheet of the document in the scanner 2070.

If a document that has not yet been scanned is present in the scanner 2070 and there is a scan request from the job manager 1519, then the scan-sequence control unit 8204 is again requested to perform scanning by the scan parameters 8302 stored in the DIS 7102. If an unscanned document is not present in the scanner 2070, or if there is no scan request from the job manager 1519, the job manager 1519 is notified of the completion of scanning. This indicates the end of the scanning operation.

Printing operation

The details of the printing operation will now be described.

The device interface 2020 has an internal DPRAM and sets parameters in a printer, reads out the state of the printer and exchanges printing control commands via the DPRAM. Further, this board has a video controller and transmits image data, which has been expanded on the bus 2008, to the printer via an engine interface cable in sync with VCLK (a video clock) and HSYNC supplied from the printer via the engine interface cable.

Figure 20:
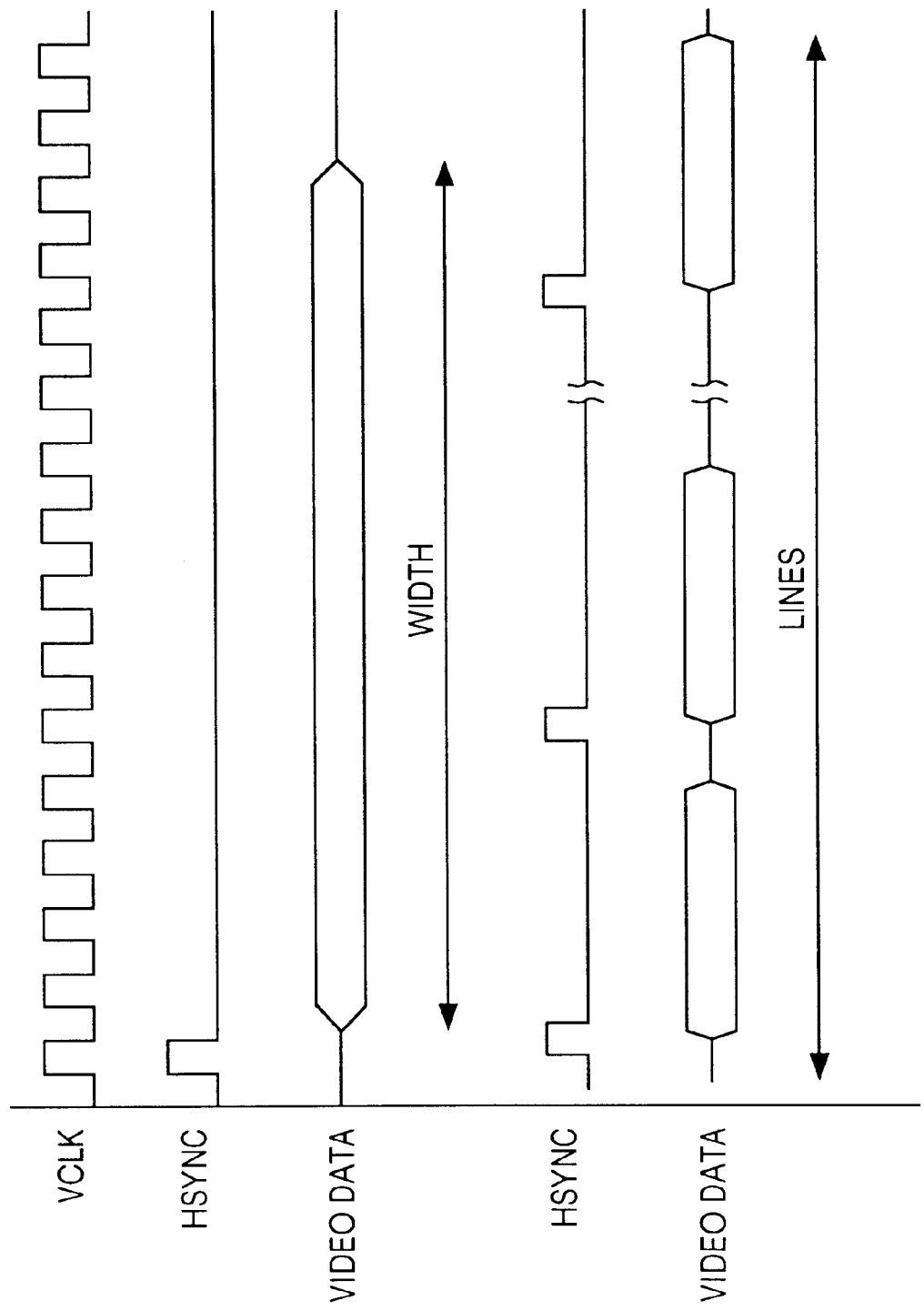
FIG. 20 is a waveform diagram showing transfer timing of data at the time of printing.

Transmission timing is as shown in FIG. 20 when expressed in the form of a timing chart. VCLK is produced at all times and HSYNC is applied in sync with the start of one line of printing by the printer. The video controller reads data in an amount equivalent to the set image width (WIDTH) out of the RAM 2002 and outputs the data to the engine interface cable as a video signal. After this is repeated for the designated number of lines (LINES), the video controller generates an image-end interrupt.

As described earlier, when a print-job command is delivered to the control API from an application program run by the CPU, the control API delivers this command to the job manager 1519 of the control level as a job. Furthermore, the job manager 1519 stores the job settings in the DIS 7102 and instructs the printer manager 1526 to start the printing job. Upon accepting the job, the print manager 1526 reads information, which is necessary for job execution, out of the DIS and sets this information in the printer via the engine interface board and DPRAM. If an image has been compressed, the print manager module 1526 requests the CODEC manager to expand the image. In accordance with this request, the CODEC manager expands the image file into a bitmap image by an expansion method (JPEG, MMR, etc.) specified by the manager. The expanded image is stored in the RAM 2002.

Figure 21:
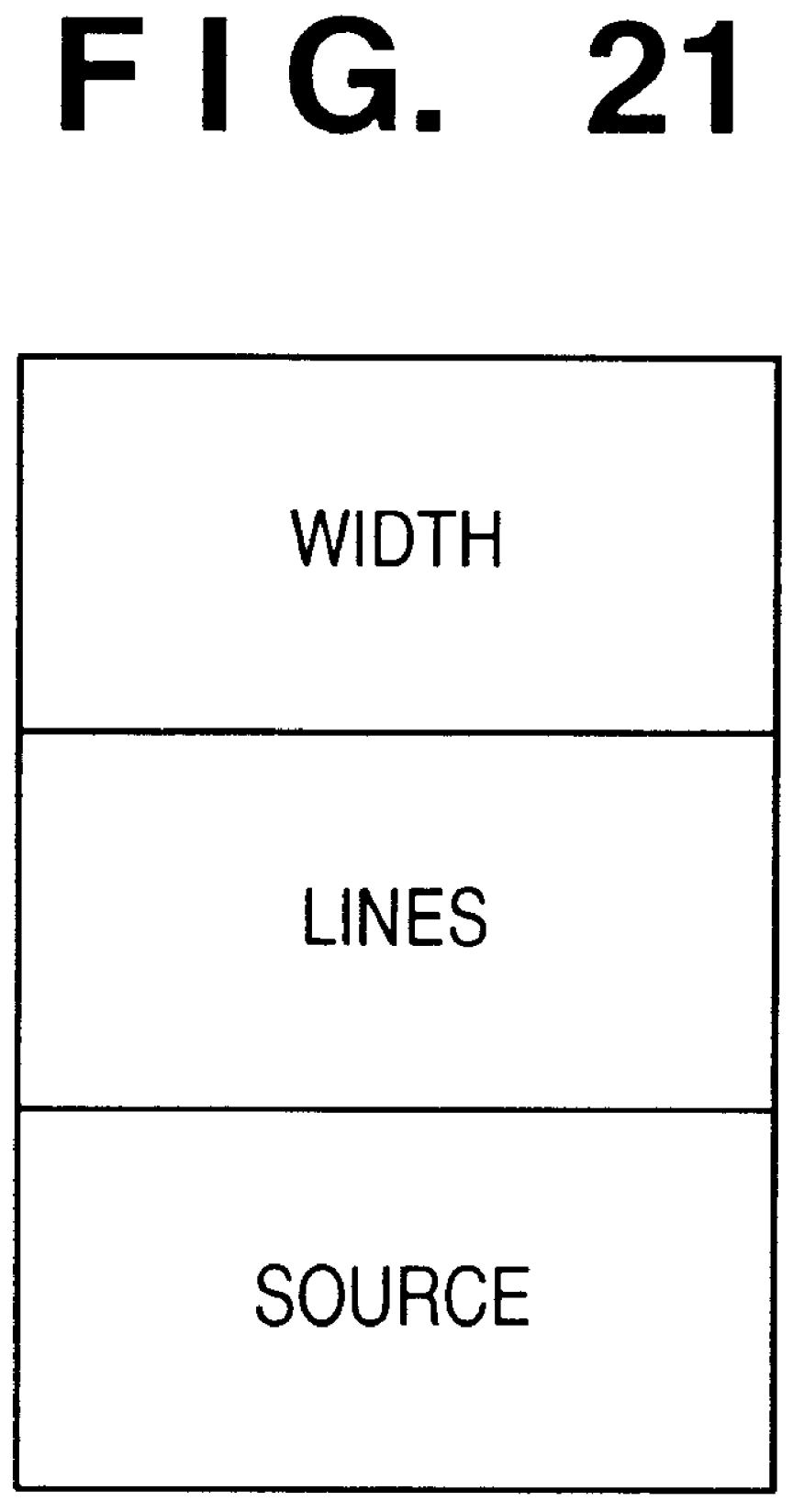
Figure 22:
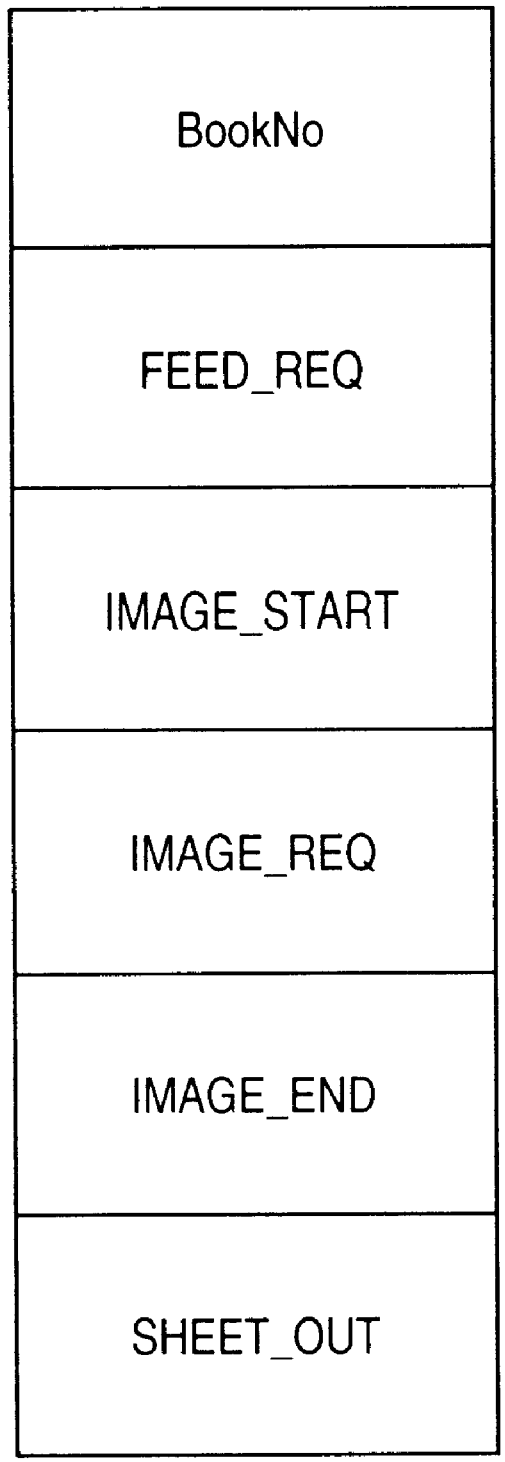
FIG. 22 is a diagram showing communication commands between a printer and the engine interface board.

The setting items of the device interface 2020 are shown in FIG. 21, and the setting items, control commands and status commands sent to the printer via the DPRAM are illustrated in FIG. 22.

Operation in regard to printing of a bitmap image will now be described in detail. It will be assumed that two pages (one copy each) of a binary image of letter size (11"×8.5") are printed using a printer having a 600-dpi capability.

When expansion of the image is finished, the print manager calculates the number of image bytes for an image of this width (8.5" in this case) as follows:

WIDTH=8.5×600÷8=630 (bytes)

The print manage then calculates the number of lines as follows:

LINES=11×600=6600 (lines)

These calculated values and the source address of the RAM 2002 storing the image of the first page applied thereto are set at WIDTH, LINES and SOURCE shown in FIG. 21. Though preparation of the image output is completed at this point, the device interface does not output the image data because the HSYNC signal from the printer has not yet arrived (though the VCLK signal is arriving).

Next, the print manager writes 1, which is the number of output copies, to a prescribed address (Book No.) of the DPRAM shown in FIG. 22. The print manager thenceforth issues a paper-feed request (FEED_REQ) for output of paper for the first page and waits for IMAGE_REQ from the printer. When IMAGE_REQ arrives from the printer, the print manager issues IMAGE_START. Upon receiving IMAGE_START, the printer starts issuing HSYNC and the interface 2020, which has been waiting for HSYNC, outputs the image. Upon detecting the trailing edge of the output paper, the printer outputs IMAGE_END. When the output paper is discharged, the printer outputs SHEET_OUT. The print manager receives IMAGE_END of the first page, sets WIDTH, LINES, SOURCE of the second page in the engine interface board, outputs FEED_REQ and waits for IMAGE_REQ. Operation following arrival of IMAGE_REQ of the second page is similar to that of the first page.

[CODEC selection]

Selection of a software CODEC or hardware CODEC, which is a characterizing feature of the present invention, will now be described in detail.

The timing of the flow of data at the time of scanning and printing will be described first. The universal send function will be described as an example of scanning. An image scanned by the scanner is first written to the RAM 2002 from the device interface 2020 via the bus 2008. Next, the image is read out of the RAM 2002, encoded by hardware or software and then stored in the RAM 2002 again.

In case of encoding by hardware, the image is compressed by the CODEC 2040 via the bus 2008. If compression is performed by software, the image is read out of the RAM 2002, compressed by the CPU 2001 and stored in the RAM 2002. The image that has been stored in the RAM 2002 is converted to a general-purpose format such as a TIFF file and is then stored in the RAM 2002 and hard disk of the hard-disk drive 2004. Finally, the file read out of the RAM 2002 and hard-disk drive 2004 is transferred to another device on the network via the network interface 2010.

Figure 23:
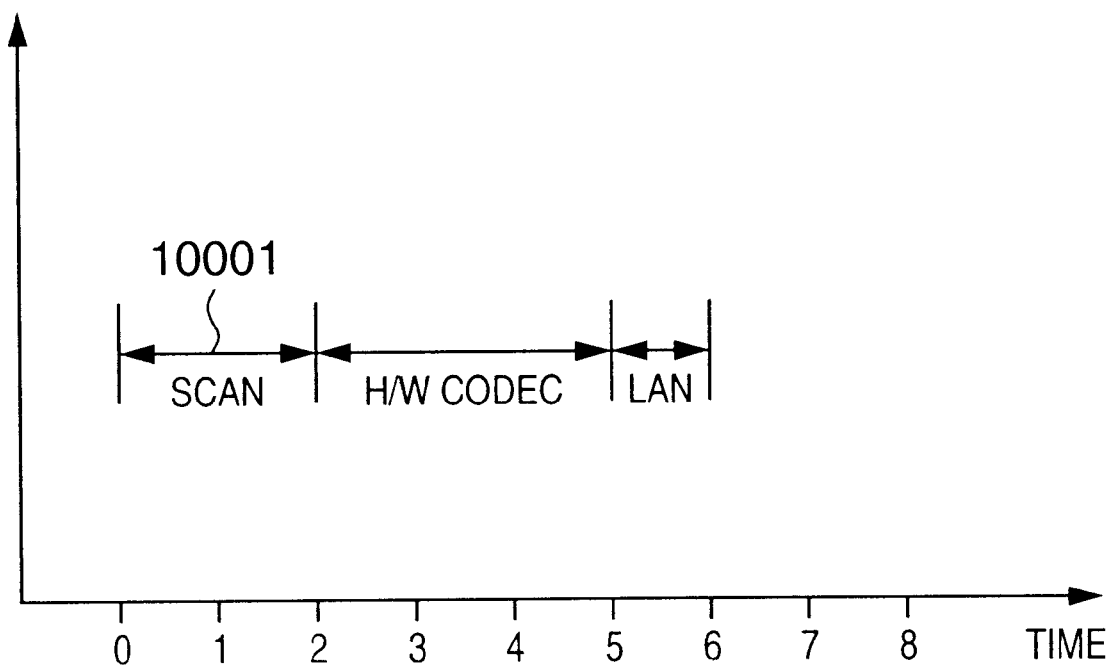
FIG. 23 is a timing chart at the time of single-page scan.

The status of use of the bus 2008 when this series of operations is carried out is illustrated in the timing chart of FIG. 23. The data transfer rate of bus 2008 in FIG. 23 is assumed to be an average of 2 MB/s. The amount of data transferred in the scanning operation is assumed to be 4 MB in case of size A4 paper and a 600-dpi scanner. The CODEC 2040 is assumed to perform compression at a compression rate of ½ (i.e., an input of 4 MB is compressed to an output of 2 MB). The amount of data processed in the image compression operation by the CODEC 2040 is 6 MB. The amount of data transferred by LAN is 2 MB. Since compression is performed after scanning is completed and data is transferred on the LAN after compression is completed, each function uses the image bus independently.

The remote copy print function will be described as an example of the printing operation. Image data (a TIFF compressed image) that has been sent via the network interface 2010 and bus 2008 first is stored in the RAM 2002 and hard disk of the hard-disk drive 2004. Next, after a TIFF or other superfluous header is removed, the compressed data is stored in the RAM 2002. Data read out of the RAM 2002 is decoded by hardware (bus 2008→CODEC 2040→bus 2008) or software and the decoded data is stored in the RAM 2002 again. Finally, the image in the form of a bitmap is read out of the RAM 2002 and printed out by the printer 2095 via the bus 2008 and device interface.

Figure 24:
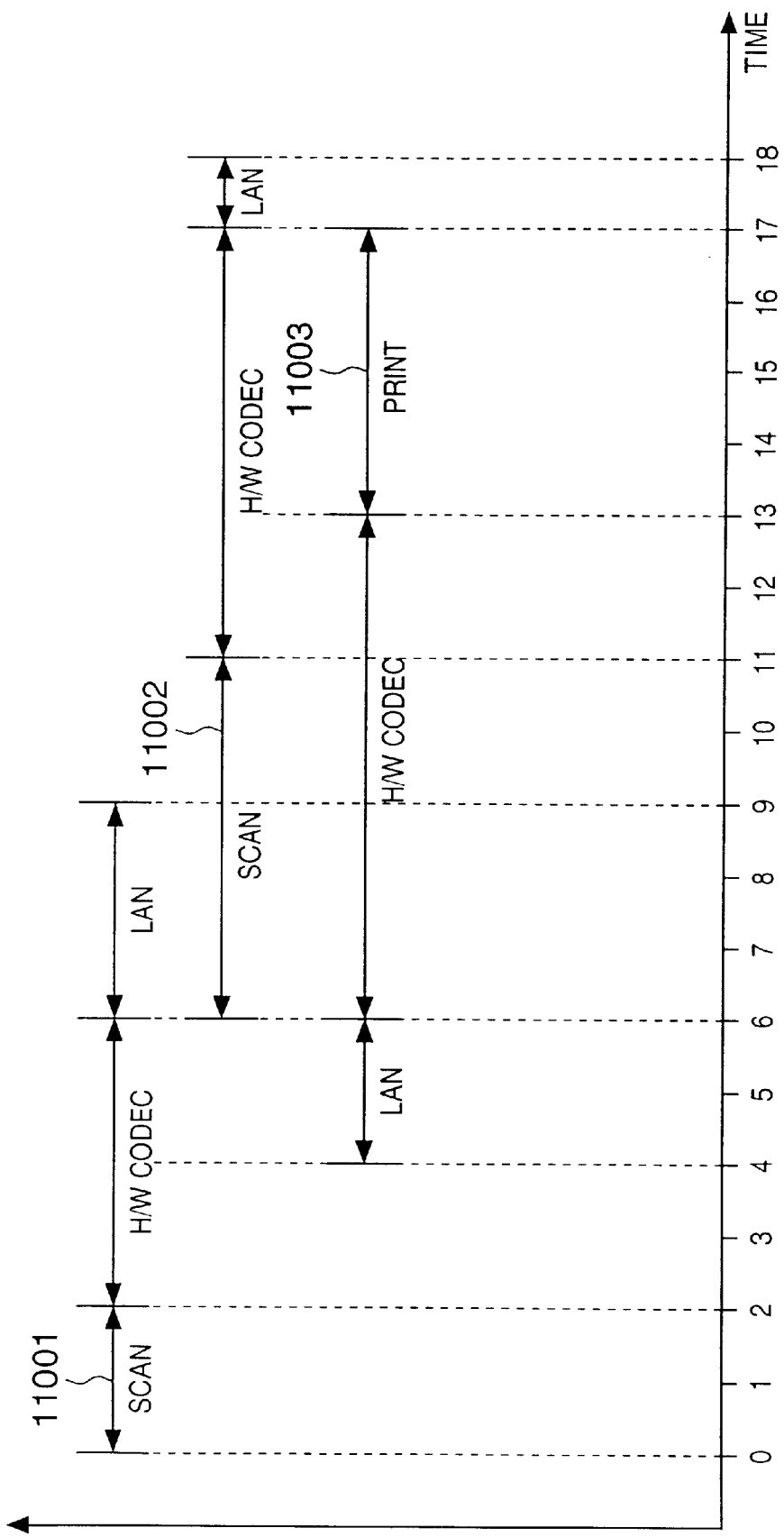
FIG. 24 is a timing chart in a case where multiple jobs are generated simultaneously.

Reference will be had to FIG. 24 to describe timing in a case where a scan request (for two pages of a document) in the above-described universal send function and a print request (for one page) according to the remote copy print function are generated simultaneously. This description deals with parallel processing in which a print job is executed in parallel with a certain job, e.g., a scanner job. Scanning of the first page based upon the scan job is indicated at 11001 and scanning of the second page based upon the scan job is indicated at 11002, and printing in accordance with the print job is indicated at 11003.

When the first page is scanned, the hardware CODEC and the LAN on which the print operation is performed use the bus 2008 simultaneously. As a consequence, bus contention caused by the two functions occurs and processing takes twice as much time as would be required if the bus were used independently. More specifically, the hardware CODEC starts processing at time 2 in FIG. 24, 4 MB of data remains at time 3 and 2 MB of data remains at time 4. At time 4, however, transfer of data (2 MB) to the LAN of the print job begins. Consequently, from this moment onward, transfer of 2 MB of data takes two time units for the hardware CODEC and two time units for the LAN.

At time 6, the transfer from the LAN for the first page of scanning, transfer of data for the second page of scanning and decoding of print data by the hardware CODEC take place simultaneously. Since bus contention is brought about by these three demands, processing speed is one-third of what would be the case if the bus were used separately.

Figure 25:
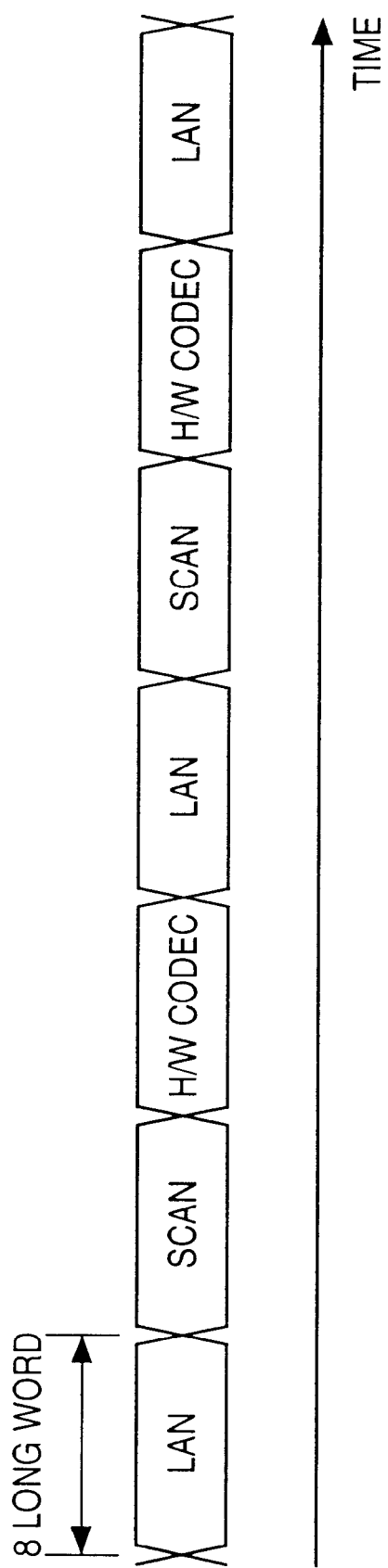
FIG. 25 is a diagram showing a data transfer sequence in a case where three processes overlap.

FIG. 25 illustrates the details of data transfer in this case. The LAN, scan and hardware CODEC data transfers are each performed in units of eight long words (1 long word=32 bits). The data is transferred in bursts in regular order.

In the present invention, therefore, the status of bus use of the resources sharing the bus 2008, such as scanners, printers and the LAN, is investigated. More specifically, test data on the order of several hundred bytes to several thousand bytes is encoded or decoded in the hardware CODEC 2040 (if there is a through-path on which image processing is not executed, then this expedient may be used instead of the test data). If processing time exceeds a predetermined value, the software CODEC is used because the bus will become congested in such case. If processing time does not exceed the predetermined value, the CODEC used is switched over to the hardware CODEC.

Figure 26:
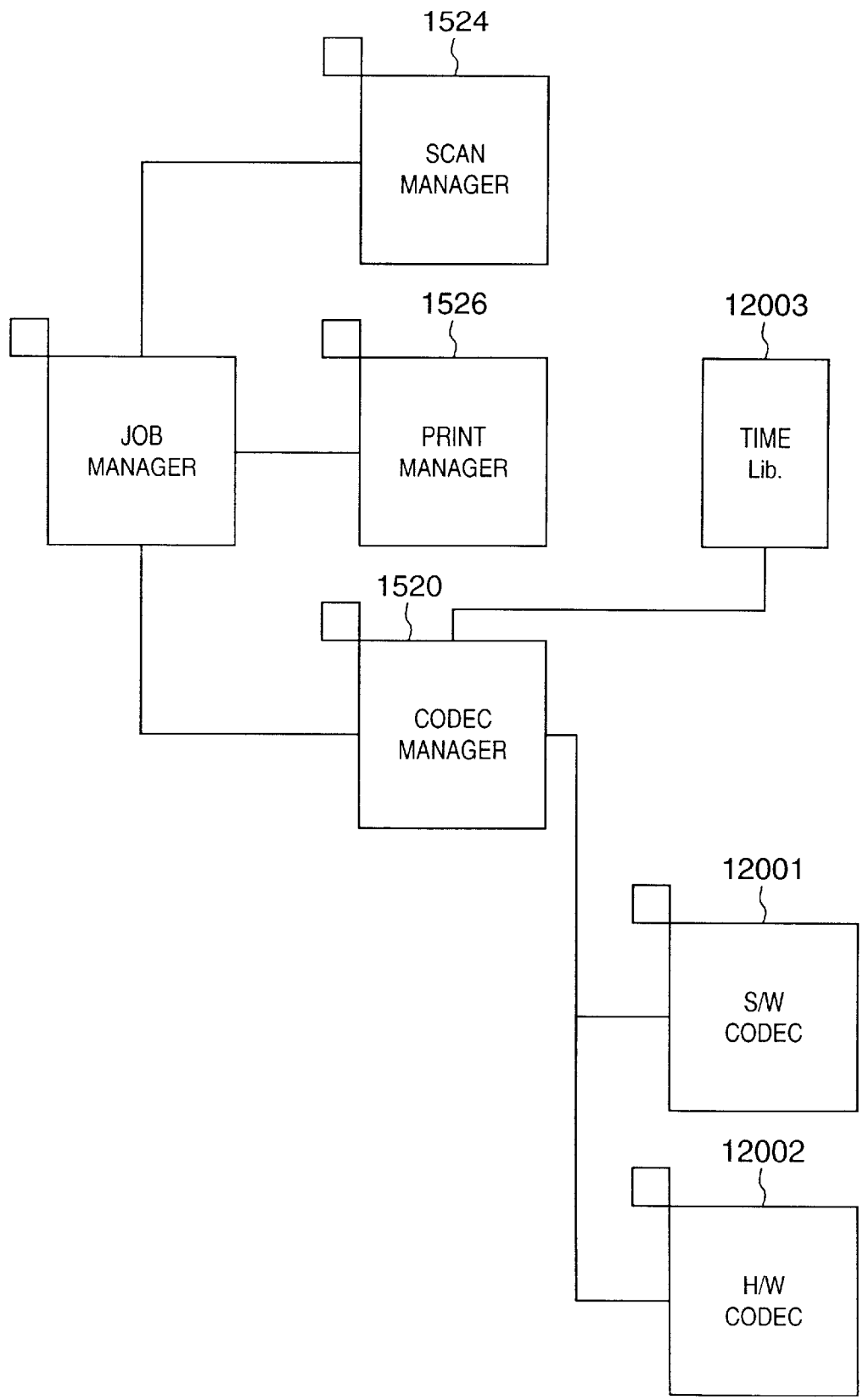
FIG. 26 is a diagram showing the organization of software surrounding a CODEC manager.

As illustrated in FIG. 26, the CODEC manager 1520 instructs a software CODEC 12001 and a hardware CODEC 12002 to perform encoding (compression) and decoding (decompression). When an image compression/decompression request has been received from the scanner manager 1524 or print manager 1526, the CODEC manager 1520 instructs the hardware CODEC 12002 to encode (or decode) test data. Information representing the time that was needed for processing is obtained by interrogating a time library 12003.

The operation of the CODEC manager 1520 will now be described with reference to the flowchart of FIG. 27.

The hardware CODEC is initialized at start-up at step S16001. This includes making PCI configuration settings and initializing the registers of the CODEC chip. Next, it is determined at step S16002 whether there is a compression/decompression request from the scanner manager 1524 or print manager 1526. Processing is exited if there no request. If a request is received, on the other hand, the present time is acquired from the time library 12003 at step S16003.

The start of compression (or decompression) of test data that has been stored in RAM 2002 is instructed at step S16004 and it is determined at step S16005 whether this processing has been completed. If processing has not been completed, the system waits until processing is completed. When processing is completed, the present time is acquired from the time library 12003 again. The time that was required for compression (or decompression) of the test data is found at step S16007 by calculating the difference between two times obtained at steps S16003 and S16006.

If it is found at step S16008 that the time calculated at step S16007 is less than a predetermined value, this means that the load on the bus is light and it is judged that processing by the hardware CODEC will be faster. Accordingly, the CODEC manager instructs that the hardware CODEC execute processing at step S16009. It is determined at step S16010 whether processing has ended. If the answer is "YES", control returns to step S16002. If it is found at step S16008 that the time calculated at step S16007 is equal to or greater than the predetermined value, this means that the bus is under a heavy load and it is judged that the software coder will be faster. Accordingly, the CODEC manager instructs that the software CODEC execute processing at step S16011. It is determined at step S16012 whether processing has ended. If the answer is "YES", control returns to step S16002.

Figure 27:
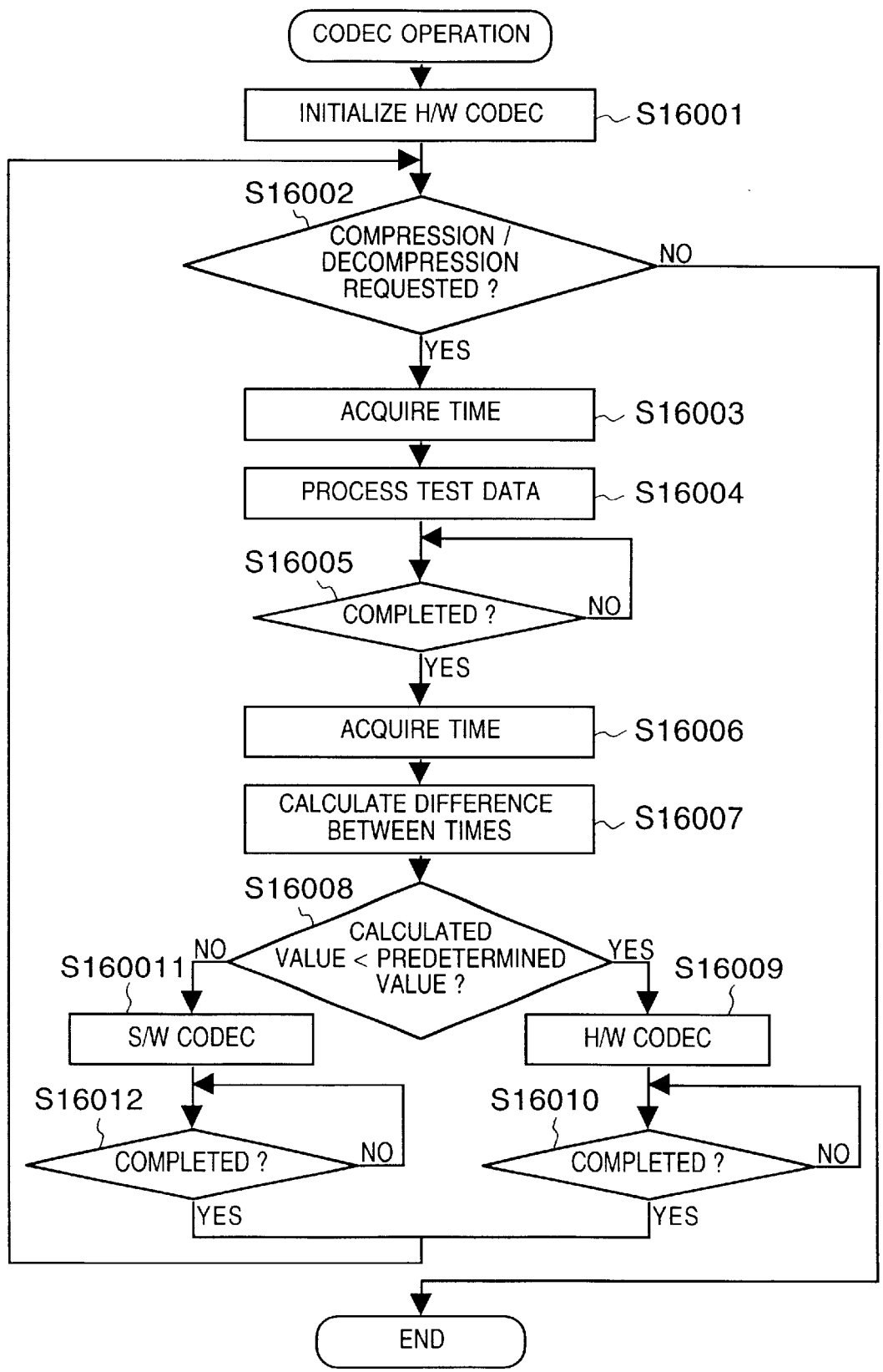
FIG. 27 is a flowchart illustrating operation of a CODEC in a first embodiment of the present invention.

In the example of FIG. 24, the CODEC selection processing by the CODEC manager 1520 shown in FIG. 27 is executed before (1) hardware CODEC processing for scanning of the first page (11001), before (2) hardware CODEC processing for printing of the first page (11003), and before (3) hardware CODEC processing for scanning of the second page (11002).

Figure 28:
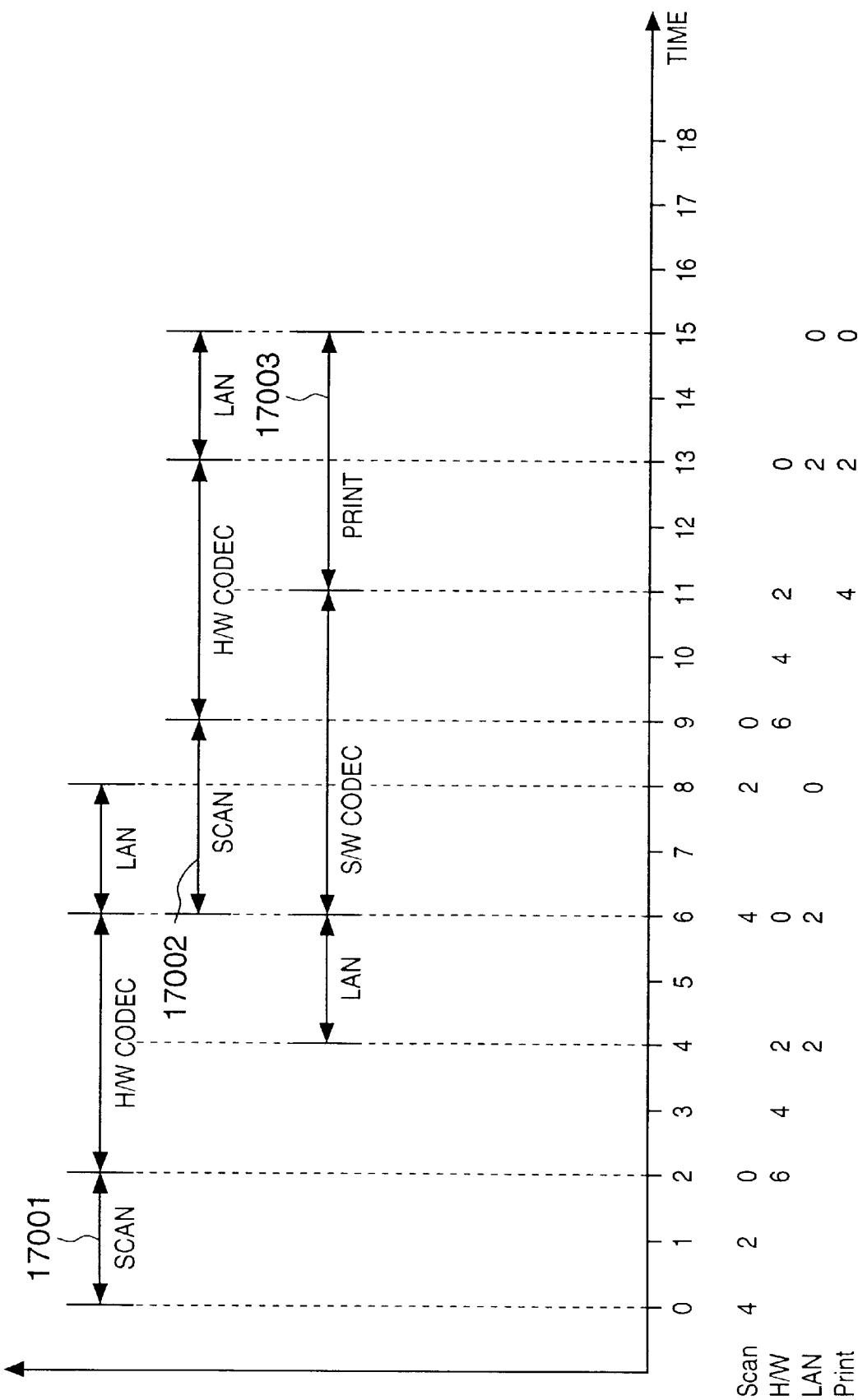
FIG. 28 is a timing chart when a CODEC according to the first embodiment is changed over in FIG. 27.

FIG. 28 illustrates a processing diagram in a case where the above-described CODEC selection processing is applied in a job schedule the same as that shown in FIG. 24. Here it is assumed that the test data is composed of 1024 bytes and that the predetermined value (used at step S16008 in FIG. 27) which decides the selection of the software CODEC or hardware CODEC has been set to 1 ms. Further, the average data transfer rate of bus 2008 is assumed to be 2 MB/s, which is the same as in FIG. 23. The amount of data transferred in the scanning operation is assumed to be 4 MB in case of size A4 paper and a 600-dpi scanner. The CODEC 2040 is assumed to perform compression at a compression rate of ½ (i.e., an input of 4 MB is compressed to an output of 2 MB). The amount of data processed in the image compression operation by the CODEC 2040 is 6 MB. The amount of data transferred by LAN is 2 MB. Since compression is performed after scanning is completed and data is transferred on the LAN after compression is completed, each function uses the image bus independently. The progress of these processes and status of use of the bus 2008 are indicated in units of time at the bottom of FIG. 28.

First, at scan processing (17001) for the first page, the hardware CODEC is made to encode the test data. On the assumption that this processing ends in 700 $\mu$s, the hardware CODEC is selected since this period of time is shorter than 1 ms. Next, at print processing (17003) for the first page, the test data is encoded and on the assumption that processing ends in 2 ms, the software CODEC is selected. At scan processing (17002) for the second page, the hardware CODEC is made to encode the test data. On the assumption that this processing ends in 600 $\mu$s, the hardware CODEC is selected.

It will be understood that as a result of such selection processing, the scanning and printing jobs both end earlier in FIG. 28 than in the example of FIG. 24.

(Second Embodiment)

In the first embodiment described above, which CODEC to be used is determined based upon the occupancy of the image bus 2008. In this embodiment, however, which CODEC to be used is determined based upon status of utilization of CODECs.

This embodiment will be described taking as an example a case where the MMR CODEC 1523 (FIG. 12) implements a software CODEC, the image compressor/decompressor 2043 (FIG. 6) is an MMR hardware CODEC and these two CODECs are allocated to processing. Further, in this embodiment, the image compressor/decompressor 2043 may be provided with a plurality of internal hardware CODECs.

Figure 29:
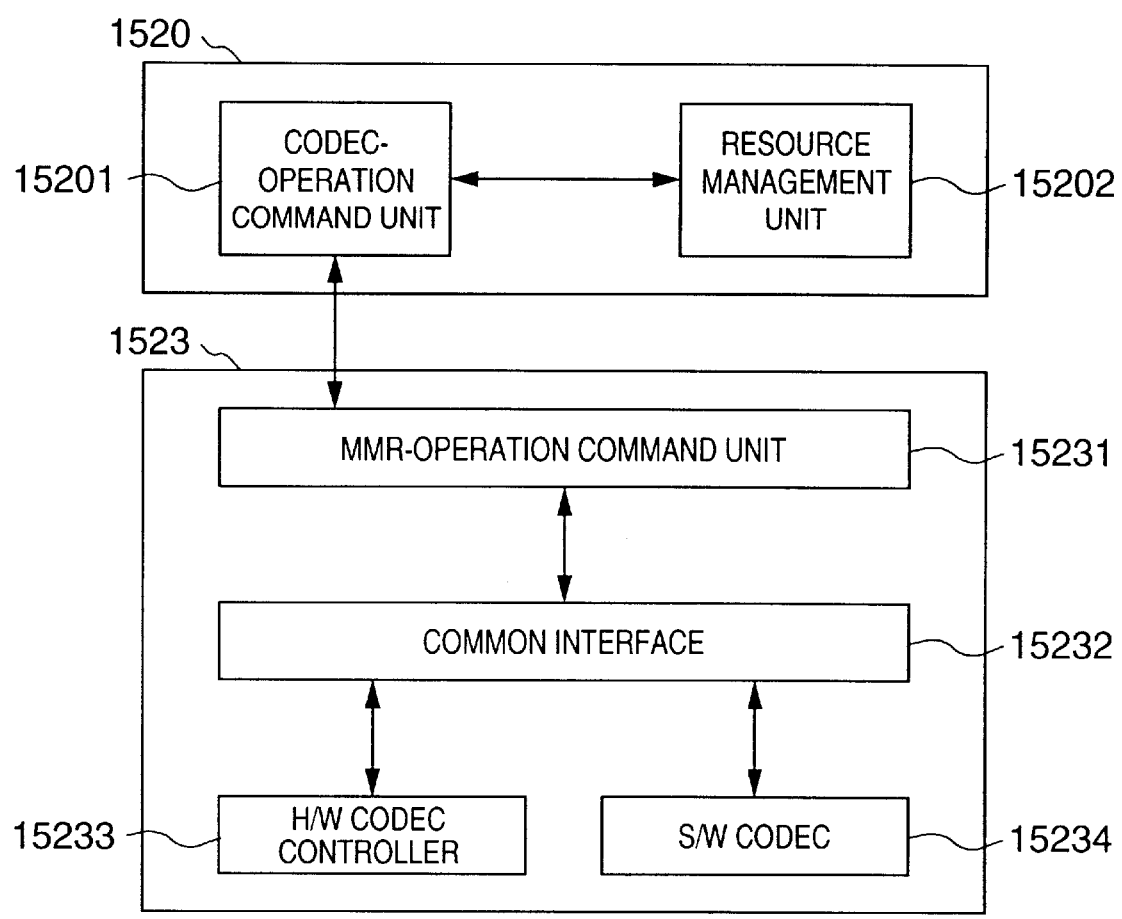
FIG. 29 is a diagram showing the organization of software in a CODEC manager and MMR CODEC in a second embodiment of the present invention.

FIG. 29 is a block diagram showing an example of the organization of software modules in the CODEC manager 1520 and MMR CODEC 1523 in this embodiment of the present invention.

The CODEC manager 1520 internally comprises a CODEC-operation command unit 15201 for instructing the MMR CODEC 1523 to execute encoding or decoding, and a resource management unit 15202 for managing the CODEC as a resource. The CODEC manager 1520 causes encoding/decoding to be executed in response to a request from the scanner manager 1524 (FIG. 12) or print manager 1526. Upon receiving the request, the CODEC resource is reserved by the resource management unit 15202. If this resource has been reserved, the MMR CODEC 1523 is requested to execute processing.

When an MMR-operation command unit 15231 within the MMR CODEC 1523 receives a processing command, the unit 15231 requests the CODEC to execute processing via a common interface 15232 regardless of whether the resource is the hardware CODEC or software CODEC. By adopting a common interface for the CODECs, it will suffice to change the layers below the common interface 15232 when the change is made from the hardware CODEC to the software CODEC or vice versa.

The common interface 15232 identifies whether the destination of the processing request is the hardware CODEC or software CODEC and divides the processing request between a hardware-CODEC controller 15233 and a software CODEC 15234.

When encoding or decoding by the hardware CODEC has been commanded, the hardware-CODEC controller 15233 instructs the image compressor/decompressor 2043 (FIG. 6) to execute encoding or decoding. When encoding or decoding by the software CODEC has been commanded, the software CODEC 15234 performs encoding/decoding using the CPU 2001.

(CODEC allocation processing)

Figure 30:
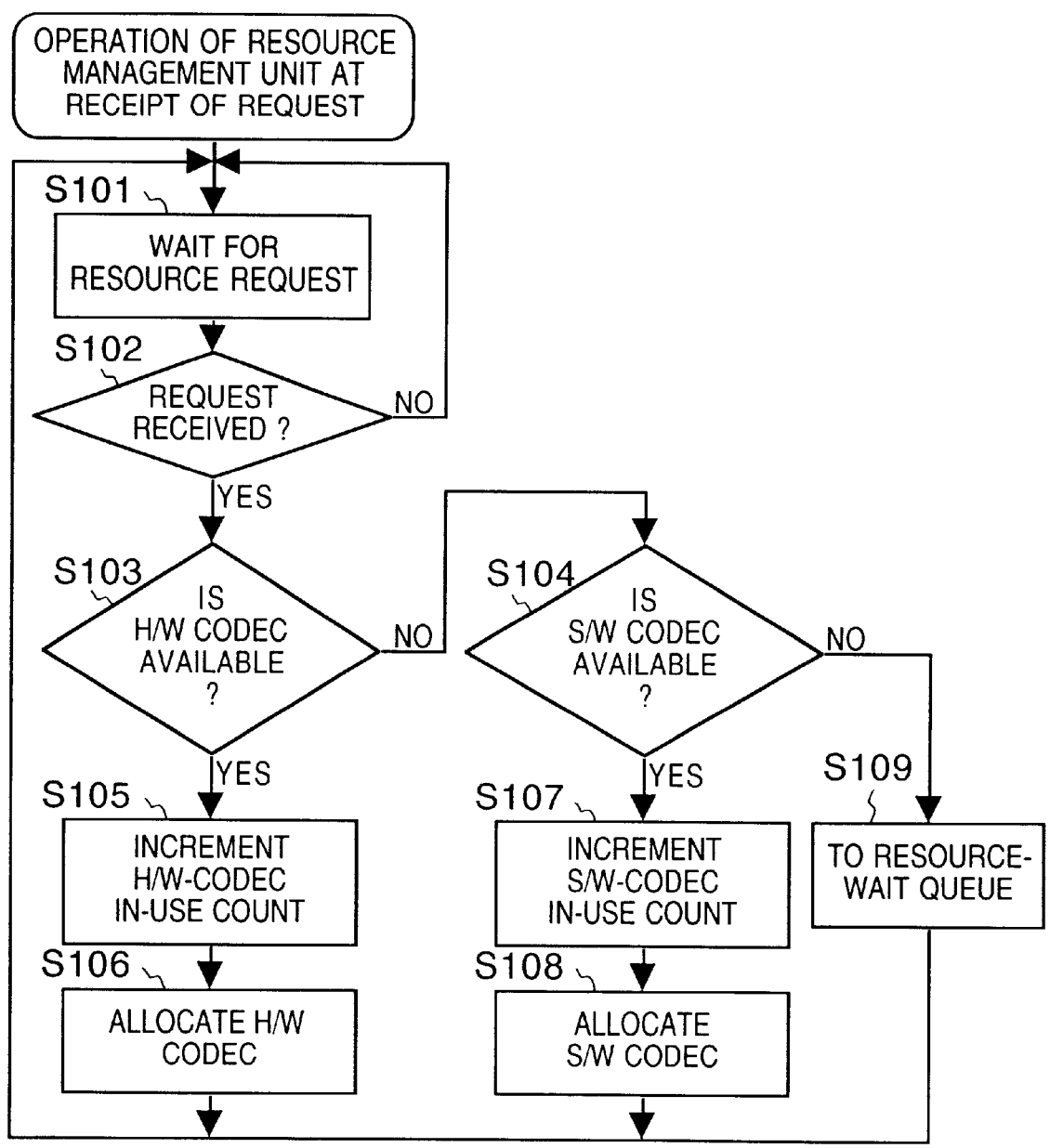
FIG. 30 is a flowchart useful in describing CODEC allocation processing in the second embodiment.

Operation when the resource management unit 15202 receives a resource request will be described with reference to the flowchart shown in FIG. 30.

First, the resource management unit 15202 waits for a resource request from the CODEC-operation command unit 15201 at step S101. If such a request is not received even at step S102, the management unit waits for a resource request again and control returns to step S101. If a request is received, the resource management unit 15202 determines whether a hardware CODEC is available at step S103. The resource management unit 15202 supervises the number of hardware CODECs, the number of software CODECs, the number of these CODECs being used and which CODECs are currently in use.

FIG. 31 is a diagram showing an example of CODEC management in the resource management unit 15202. The resource management unit 15202 is capable of managing CODECs in accordance with a table format of the kind shown in FIG. 31. Here a CODEC type area 310 indicates the CODEC type, i.e., hardware CODEC or software CODEC. An area 311 indicative of number of CODECs in use records, per CODEC type, the number of CODECs currently in use in a case where a plurality of CODECs are provided. A number area 312 stores the CODEC numbers for each type. A status flag area 313 is an area in which "YES" is stored if the corresponding CODEC is currently in use and "NO" is stored if the CODEC is not currently in use.

The example of FIG. 31 illustrates a case where the resource management unit 15202 is managing five hardware CODECs and five software CODECs, three of the hardware CODECs are currently executing processing and two of the software CODECs are currently executing processing.

With reference again to FIG. 30, if it is determined at step S103 that a hardware CODEC is available, the value of the area 311 in the resource management unit 15202 indicating the number of in-use hardware CODECs is incremented (step S105), the value in the status flag area 313 of the allocated CODEC is changed from NO to YES and this hardware CODEC is allocated (step S106).

On the other hand, if it is found at step S103 that a hardware CODEC is not available, the resource management unit 15202 determines whether an idle software CODEC is available at step S104. If an idle software CODEC is available, the value of the area 311 in the resource management unit 15202 indicating the number of in-use hardware CODECs is incremented (step S107), the value in the status flag area 313 of the allocated CODEC is changed from "NO" to "YES" and this software CODEC is allocated (step S108).

If it is found at step S104 that a software CODEC is not available, the resource management unit 15202 writes the resource request to a resource-wait queue possessed by the resource management unit 15202 (step S109).

(CODEC deallocation processing)

Figure 32:
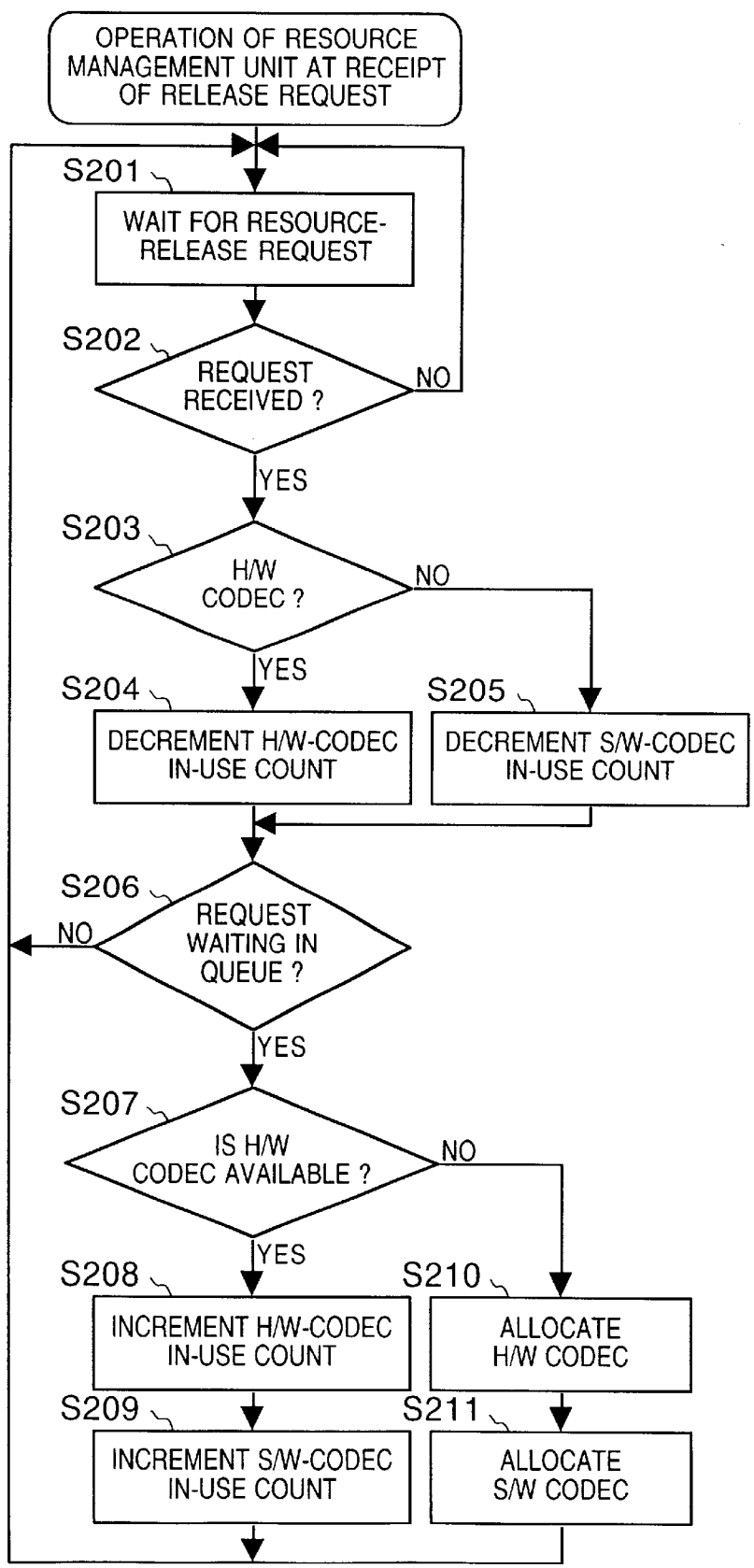
FIG. 32 is a flowchart useful in describing resource release processing according to the second embodiment.

Operation when the resource management unit 15202 receives a resource-release request will be described with reference to the flowchart shown in FIG. 32.

First, the resource management unit 15202 waits for a resource-release request from the CODEC-operation command unit 15201 at step S101. If such a request is not received even at step S202, the management unit waits for the request again and control returns to step S201. If the release request is received and the object of the release request is a hardware CODEC ("YES" at step S203), the value of the area 311 in the resource management unit 15202 indicating the number of in-use hardware CODECs is decremented and the value in the status flag area 313 of this CODEC is changed from YES to NO (step S204).

On the other hand, if it is found at step S203 that the object of the release request is a software CODEC ("NO" at step S203), the value of the area 311 in the resource management unit 15202 indicating the number of in-use software CODECs is decremented and the value in the status flag area 313 of this CODEC is changed from "YES" to "NO" (step S205).

If a CODEC in use is released, it is determined at step S206 whether a waiting request is present in the resource-wait queue. If a request is not waiting, control returns to the resource-release waiting step S201.

If there is a waiting request, it is determined at step S207 whether there is an idle hardware CODEC available. If there is a hardware CODEC available, the value of the area 311 in the resource management unit 15202 indicating the number of in-use hardware CODECs is incremented (step S208), the value in the status flag area 313 of the allocated CODEC is changed from "NO" to "YES" and this hardware CODEC is allocated (step S210).

On the other hand, if it is found at step S207 that a hardware CODEC is not available, the value of the area 311 in the resource management unit 15202 indicating the number of in-use software CODECs is incremented (step S209), the value in the status flag area 313 of the allocated CODEC is changed from "NO" to "YES" and this software CODEC is allocated (step S211).

(Operation of CODEC-operation command unit)

Figure 33:
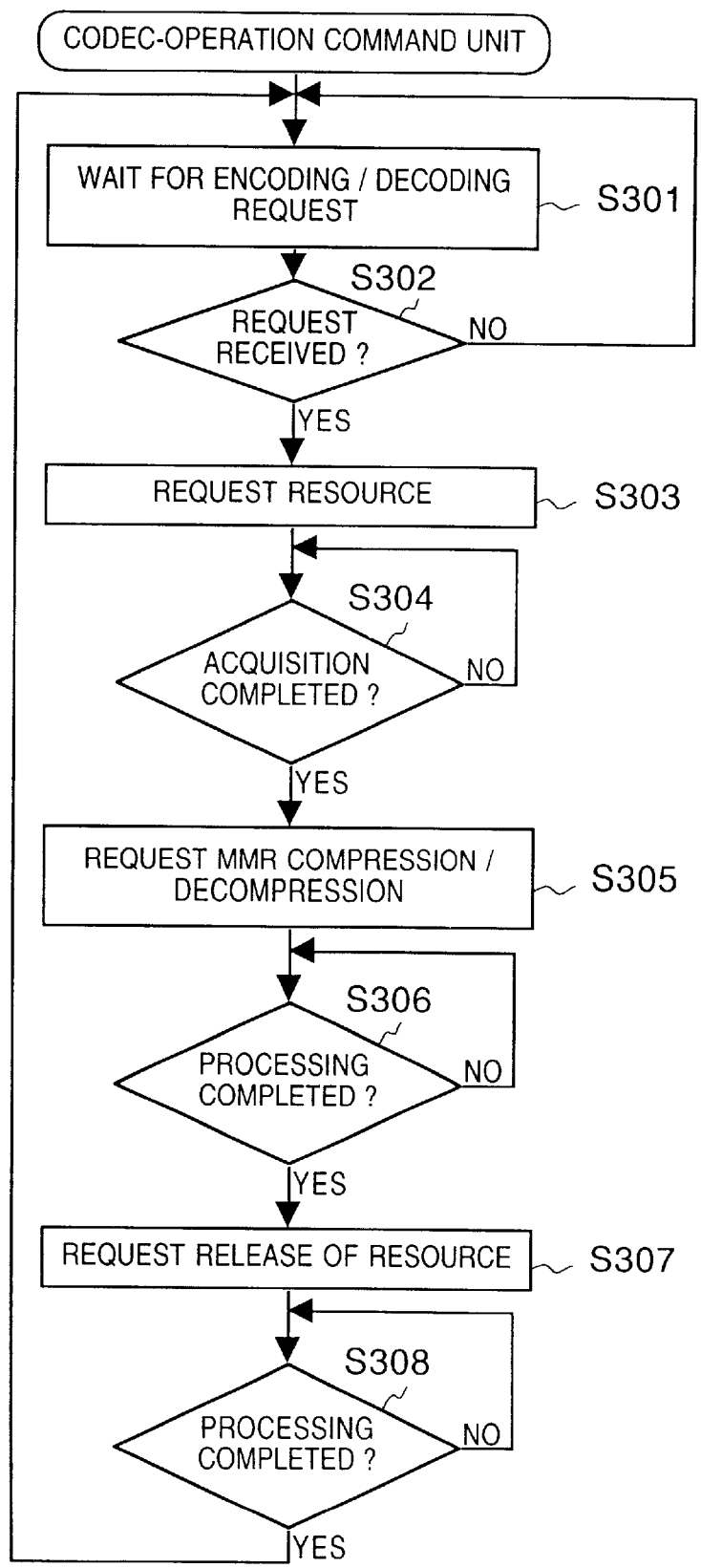
FIG. 33 is a flowchart useful in describing the operation of a CODEC operation command unit in the second embodiment.

The operation of the CODEC-operation command unit 15201 will be described with reference to the flowchart shown in FIG. 33.

The CODEC-operation command unit 15201 waits at step S301 for an encoding/coding request from the scanner manager 1524 or print manager 1526 to be received via the job manager 1519. If such a request is not received ("NO" at step S302), control returns to the request waiting step S301. If the request is received ("YES" at step S302), then the CODEC-operation command unit 15201 requests the resource management unit 15202 for a CODEC (step S303).

If a CODEC cannot be acquired, then the CODEC-operation command unit 15201 waits (step S304). When a CODEC has been acquired, the CODEC-operation command unit 15201 responds to the request from the scanner manager 1524 or print manager 1526 by requesting the MMR CODEC 1523 to perform MMR compression/decompression (step S305). The CODEC-operation command unit 15201 waits until compression/decompression is completed (step S306). When this processing is completed, a CODEC-release request is sent to the resource management unit 15202 at step S307 in order to release the resource. The CODEC-operation command unit 1520I waits until this processing is completed (step S308). When this processing is completed, the resource management unit 15202 again waits for an encoding/decoding request.

(Other embodiments)

The foregoing embodiments have been described only in regard to a case where a CODEC for executing encoding/decoding processing is implemented by both software and hardware. However, the present invention is applicable also to a case where general image processing such as zooming and rotation can be implemented by hardware and software.

Further, the foregoing embodiments have been described in regard to an example in which the data processing apparatus of the present invention is applied to an apparatus which handles image data. However, it goes without saying that the data to undergo processing is not limited to image data, and the present invention can be applied to an apparatus that handles any type of data such as voice, text and programs.

In the foregoing embodiments, use of the software CODEC is decided based upon the occupancy of the image bus 2008. However, it is conceivable that in a case where the CPU 2001 acting as the software CODEC is under a heavy load owing to other processing, use of the hardware CODEC may result is faster processing. Accordingly, an arrangement may be adopted in which use of the software CODEC is decided based upon a combination of the load upon the CPU 2001 and the occupancy of the image bus 2008.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment, and the storage medium storing the program codes constitutes the invention.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present invention is applied to the above-mentioned storage medium, program code corresponding to the flowcharts (one or more of the flowcharts of FIGS. 27, 30, 33 and 33) described earlier is stored on the storage medium.

Thus, in accordance with the present invention, as described above, the invention provides a software processor for implementing prescribed data processing by software and a hardware processor, which is connected to a common bus, for implementing prescribed processing by hardware, and the particular processor used is selected based upon the content of processing and the status of use of the processors, thereby making it possible to select the processor that exhibits the better efficiency. The end result is that the time required for overall processing to be completed can be optimized.

As many apparently widely different embodiments of the present invention can be made without departing from the spirit and scope thereof, it is to be understood that the invention is not limited to the specific embodiments thereof except as defined in the appended claims.

What is claimed is:

1. A data-processing apparatus having a software processor for implementing prescribed data processing by software and a hardware processor for implementing the prescribed data processing by hardware, wherein bus means which said hardware processor uses in the prescribed data processing can be used in other processing means as well, said apparatus comprising:

means for instructing said hardware processor to execute the prescribed data processing using test data; and selection means for selecting, in dependence upon time required to execute the processing of the test data, the processor to be used in the prescribed data processing executed thereafter, wherein when the time required to execute the processing of the test data is equal to or greater than a predetermined time, said selection means judges that the bus means is under a heavy load which is caused by the other processing means using the bus means, and selects the software processor which does not use the bus means.

2. The apparatus according to claim 1, wherein when the time required to execute the processing of the test data is less than the predetermined time, said selection means judges that the bus means is not under a heavy load and selects the hardware processor.

3. The apparatus according to claim 2, wherein data generating means for generating data to be subjected to the prescribed data processing is connected to said bus means.

4. The apparatus according to claim 3, wherein said data generating means comprises an image reading device.

5. The apparatus according to claim 2, wherein data utilizing means which uses result of the prescribed data processing is connected to said bus means.

6. The apparatus according to claim 5, wherein said data utilizing means comprises an image processing device.

7. The apparatus according to claim 2, wherein data generating means for generating data to be subjected to the prescribed data processing and data utilizing means which uses result of the prescribed data processing are connected to said bus means.

8. The apparatus according to claim 1, wherein the prescribed data processing comprises encoding or decoding processing.

9. A processor selection method in a data processing apparatus having a software processor for implementing prescribed data processing by software and a hardware processor for implementing the prescribed data processing by hardware, wherein bus means which the hardware processor uses in the prescribed data processing can be used in other processing means as well, said method comprising:

a step of instructing the hardware processor to execute the prescribed data processing using test data; and a selection step of selecting, in dependence upon time required to execute the processing of the test data, the processor to be used in the prescribed data processing executed thereafter, wherein when the time required to execute the processing of the test data is equal to or greater than a predetermined time, said selection step includes judging that the bus means is under a heavy load which is caused by the other processing means using the bus means, and selecting the software processor which does not use the bus means.

10. The method according to claim 9, wherein when the time required to execute the processing of the test data is less than the predetermined time, said selection step includes judging that the bus means is not under a heavy load and selects the hardware processor.

11. The method according to claim 9, wherein the prescribed data processing comprises encoding or decoding processing.

12. A computer-readable storage medium storing a processor selection program used in a data processing apparatus having a software processor for implementing prescribed data processing by software and a hardware processor for implementing the prescribed data processing by hardware, wherein bus means which the hardware processor uses in the prescribed data processing can be used in other processing means as well, said storage medium having:

a program for a step of instructing the hardware processor to execute the prescribed data processing using test data; and a program for a selection step of selecting, in dependence upon time required to execute the processing of the test data, the processor to be used in the prescribed data processing executed thereafter, wherein when the time required to execute the processing of the test data is equal to or greater than a predetermined time, said program for the selection step judges that the bus means is under a heavy load which is caused by the other processing means using the bus means, and selects the software processor which does not use the bus means.

13. The storage medium according to claim 12, wherein when the time required to execute the processing of the test data is less than the predetermined time, said program for the selection step judges that the bus means is not under a heavy load and selects the hardware processor.

14. The storage medium according to claim 12, wherein the prescribed data processing the encoding or decoding processing.

15. A data processing apparatus comprising:

a first processor for implementing a process of image data related to an image processing job which is input from a predetermined input source;

a second processor capable of implementing the same process as said first processor;

an image bus connected to said first processor for transferring the image data between the predetermined input source and said first processor;

judging means for judging a data transfer load related to another image processing job on said image bus when the process of the image data related to the image processing job from the predetermined input source is implemented; and control means for controlling said second processor to implement the process of the image data related to the image processing job when said judging means judges that the data transfer load is heavy.

16. The apparatus according to claim 15, wherein said control means further controls said first processor to implement the process of the image data related to the image processing job when said judging means judges that the data transfer load is not heavy.

17. The apparatus according to claim 15, wherein the image processing job includes a job related to an image scan operation or a print operation.

18. A control method for a data processing apparatus having a first processor for implementing a process of image data related to an image processing job which is input from a predetermined input source, a second processor capable of implementing the same process as the first processor, and an image bus connected to the first processor for transferring the image data between the predetermined input source and the first processor, said method comprising:

a judging step, of judging a data transfer load related to another image processing job on the image bus when the process of the image data related to the image processing job from the predetermined input source is implemented; and a control step, of controlling the second processor to implement the process of the image data related to the image processing job when it is judged in said judging step that the data transfer load is heavy.

19. The method according to claim 18, wherein said control step further includes controlling the first processor to implement the process of the image data related to the image processing job when it is judged in said judging step that the data transfer load is not heavy.

20. The apparatus according to claim 18, wherein the image processing job includes a job related to an image scan operation or a print operation.

21. A computer-readable storage medium storing a control program for a data processing apparatus having a first processor for implementing a process of image data related to an image processing job which is input from a predetermined input source, a second processor capable of implementing the same process as the first processor, and an image bus connected to the first processor for transferring the image data between the predetermined input source and the first processor, said storage medium having:

a program for a judging step, of judging a data transfer load related to another image processing job on the image bus when the process of the image data related to the image processing job from the predetermined input source is implemented; and a program for a control step, of controlling the second processor to implement the process of the image data related to the image processing job when it is judged in said judging step that the data transfer load is heavy.

22. The storage medium according to claim 21, wherein said program for the control step further controls the first processor to implement the process of the image data related to the image processing job when said program for the judging step judges that the data transfer load is not heavy.

23. The apparatus according to claim 21, wherein the image processing job includes a job related to an image scan operation or a print operation.

* * * * *

UNITED STATES PATENT AND TRADEMARK OFFICE
CERTIFICATE OF CORRECTION

PATENT NO. : 6,587,735 B1 Page 1 of 1
DATED : July 1, 2003
INVENTOR(S) : Hiroyuki Yaguchi It is certified that error appears in the above-identified patent and that said Letters Patent is hereby corrected as shown below:

Column 9,
Line 14, "main" should read -- mail --.

Column 12,
Line 30, "will" should read -- will now be --.

Column 17,
Line 4, "$\equiv$ 630" should read -- $\cong$ 630 --.

Column 18,
Line 14, "had" should read -- made --.

Column 23,
Line 40, "33" (first occurrence) should read -- 32 --.

Column 25,
Line 24, "the" should read -- comprises --.

Column 26,
Line 22, "The apparatus" should read -- The method --.
Line 48, "The apparatus" should read -- The storage medium --.

Signed and Sealed this

Twenty-third Day of December, 2003

JAMES E. ROGAN
*Director of the United States Patent and Trademark Office*